(12) United States Patent
Watson et al.

(10) Patent No.: US 10,927,639 B2
(45) Date of Patent: Feb. 23, 2021

(54) METHODS OF COMPLETING A WELL AND APPARATUS THEREFOR

(71) Applicant: THRU TUBING SOLUTIONS, INC., Oklahoma City, OK (US)

(72) Inventors: Brock W. Watson, Sadler, TX (US); Gary P. Funkhouser, Moore, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 343 days.

(21) Appl. No.: 15/837,502

(22) Filed: Dec. 11, 2017

(65) Prior Publication Data

US 2018/0163504 A1 Jun. 14, 2018

Related U.S. Application Data

(60) Provisional application No. 62/433,459, filed on Dec. 13, 2016.

(51) Int. Cl.

| | | |
|---|---|---|
| *E21B 33/13* | (2006.01) | |
| *C09K 8/42* | (2006.01) | |
| *E21B 23/00* | (2006.01) | |
| *C04B 40/00* | (2006.01) | |
| *C09K 8/516* | (2006.01) | |

(Continued)

(52) U.S. Cl.
CPC .......... *E21B 33/13* (2013.01); *C04B 40/0092* (2013.01); *C09K 8/426* (2013.01); *C09K 8/516* (2013.01); *E21B 23/00* (2013.01); *E21B 33/1208* (2013.01); *E21B 33/134* (2013.01);

(Continued)

(58) Field of Classification Search
None
See application file for complete search history.

(56) References Cited

U.S. PATENT DOCUMENTS

| | | |
|---|---|---|
| 1,621,970 A | 3/1927 | Coates et al. |
| 2,640,548 A | 6/1953 | Baker |

(Continued)

FOREIGN PATENT DOCUMENTS

| | | |
|---|---|---|
| WO | 2007066254 A2 | 7/2007 |
| WO | 2017014820 A1 | 1/2017 |

OTHER PUBLICATIONS

International Search Report with Written Opinion dated Jan. 26, 2016 for PCT Patent Application No. PCT/US15/038248, 16 pages.

(Continued)

*Primary Examiner* — Anuradha Ahuja
(74) *Attorney, Agent, or Firm* — Smith IP Services, P.C.

(57) ABSTRACT

A method can include conveying a dispensing tool through a wellbore, the dispensing tool including an enclosure containing plugging devices, and then opening the enclosure by cutting a material of the enclosure, thereby releasing the plugging devices from the enclosure into the wellbore at a downhole location. A dispensing tool can include a container having an enclosure therein, the enclosure including a flexible material that contains the plugging devices, and an end of the enclosure being secured to a member displaceable by an actuator. The enclosure material is cut in response to displacement of the member by the actuator. A plugging device can include at least one body configured to engage an opening in the well and block fluid flow through the opening, and multiple fibers including staple fibers or filaments formed into yarn.

7 Claims, 11 Drawing Sheets

(51) Int. Cl.
*E21B 33/12* (2006.01)
*E21B 33/134* (2006.01)
*E21B 43/26* (2006.01)

(52) U.S. Cl.
CPC .......... *C09K 2208/08* (2013.01); *E21B 43/26* (2013.01); *E21B 2200/06* (2020.05)

(56) References Cited

U.S. PATENT DOCUMENTS

| | | | |
|---|---|---|---|
| 2,768,693 A | | 10/1956 | Hughes, Jr. |
| 2,788,072 A | | 4/1957 | Goodwin |
| 2,838,117 A | | 6/1958 | Clark, Jr. et al. |
| 2,956,624 A | | 10/1960 | Toelke |
| 2,966,946 A | * | 1/1961 | Kanady .................. E21B 23/04 |
| | | | 166/135 |
| 2,970,645 A | | 2/1961 | Glass |
| 3,028,914 A | | 4/1962 | Flickinger |
| 3,170,517 A | | 2/1965 | Graham et al. |
| 3,376,934 A | | 4/1968 | Willman et al. |
| 3,399,726 A | | 9/1968 | Harris et al. |
| 3,417,821 A | | 12/1968 | Tinsley et al. |
| 3,460,624 A | | 8/1969 | Aitken et al. |
| 4,244,425 A | | 1/1981 | Erbstoesser |
| 4,421,166 A | * | 12/1983 | Cain ....................... E21B 27/02 |
| | | | 166/162 |
| 4,515,217 A | * | 5/1985 | Stout ...................... E21B 34/063 |
| | | | 166/297 |
| 5,479,986 A | | 1/1996 | Gano et al. |
| 5,507,345 A | | 4/1996 | Wehunt, Jr. et al. |
| 5,908,073 A | | 6/1999 | Nguyen et al. |
| 6,070,666 A | | 6/2000 | Montgomery |
| 6,394,184 B2 | | 5/2002 | Tolman et al. |
| 6,543,538 B2 | | 4/2003 | Tolman et al. |
| 6,655,475 B1 | | 12/2003 | Wald |
| 7,225,869 B2 | | 6/2007 | Willet et al. |
| 7,273,099 B2 | | 9/2007 | East, Jr. et al. |
| 7,673,673 B2 | | 3/2010 | Surjaatmadja et al. |
| 7,810,567 B2 | | 10/2010 | Daniels et al. |
| 7,874,365 B2 | | 1/2011 | East, Jr. et al. |
| 7,891,424 B2 | | 2/2011 | Creel et al. |
| 8,088,717 B2 | | 1/2012 | Polizzotti et al. |
| 8,240,392 B2 | | 8/2012 | Barnard et al. |
| 8,281,860 B2 | | 10/2012 | Boney et al. |
| 8,307,916 B1 | | 11/2012 | Wald |
| 8,646,529 B2 | | 2/2014 | Clark et al. |
| 8,776,886 B2 | | 7/2014 | Rondeau |
| 8,853,137 B2 | | 10/2014 | Todd et al. |
| 8,887,803 B2 | | 11/2014 | East, Jr. et al. |
| 8,950,438 B2 | | 2/2015 | Ryan |
| 9,284,798 B2 | | 3/2016 | Jamison et al. |
| 9,551,204 B2 | | 1/2017 | Schultz et al. |
| 9,567,824 B2 | | 2/2017 | Watson et al. |
| 9,567,825 B2 | | 2/2017 | Schultz et al. |
| 9,567,826 B2 | | 2/2017 | Schultz et al. |
| 9,708,883 B2 | | 7/2017 | Schultz et al. |
| 2004/0129460 A1 | | 7/2004 | MacQuoid et al. |
| 2006/0113077 A1 | | 6/2006 | Willberg et al. |
| 2006/0213662 A1 | * | 9/2006 | Creel ...................... E21B 27/02 |
| | | | 166/286 |
| 2007/0187099 A1 | | 8/2007 | Wang |
| 2008/0000639 A1 | | 1/2008 | Clark et al. |
| 2008/0196896 A1 | | 8/2008 | Bustos et al. |
| 2009/0090506 A1 | * | 4/2009 | Schafer .................. E21B 27/02 |
| | | | 166/278 |
| 2009/0120641 A1 | * | 5/2009 | Yeh ........................ E21B 43/04 |
| | | | 166/278 |
| 2010/0122813 A1 | * | 5/2010 | Trummer .............. E21B 33/138 |
| | | | 166/255.1 |
| 2010/0122814 A1 | * | 5/2010 | Picou ...................... E21B 27/02 |
| | | | 166/278 |
| 2010/0152070 A1 | | 6/2010 | Ghassemzadeh |
| 2012/0181032 A1 | | 7/2012 | Naedler et al. |
| 2012/0285659 A1 | | 11/2012 | Lafferty et al. |
| 2012/0285695 A1 | * | 11/2012 | Lafferty .................. C09K 8/03 |
| | | | 166/310 |
| 2013/0062055 A1 | * | 3/2013 | Tolman ................... E21B 23/00 |
| | | | 166/250.01 |
| 2013/0186632 A1 | | 7/2013 | Makowiecki et al. |
| 2013/0248174 A1 | * | 9/2013 | Dale ....................... E21B 23/00 |
| | | | 166/255.1 |
| 2013/0255939 A1 | * | 10/2013 | Kumaran ................ E21B 23/00 |
| | | | 166/255.1 |
| 2013/0341014 A1 | | 12/2013 | Trummer et al. |
| 2014/0116701 A1 | | 5/2014 | Tang |
| 2015/0090453 A1 | | 4/2015 | Tolman et al. |
| 2016/0040520 A1 | * | 2/2016 | Tolman ................. E21B 33/124 |
| | | | 166/308.1 |
| 2016/0130933 A1 | | 5/2016 | Madasu |
| 2016/0298018 A1 | | 10/2016 | Medvedev et al. |
| 2016/0348467 A1 | | 12/2016 | Watson et al. |
| 2017/0292343 A1 | | 10/2017 | Watson |
| 2018/0066498 A1 | | 3/2018 | Rogozinski et al. |

OTHER PUBLICATIONS

Office Action dated Apr. 13, 2016 for U.S. Appl. No. 14/698,578, 27 pages.
Office Action dated Apr. 13, 2016 for U.S. Appl. No. 14/966,812, 27 pages.
"Fabric." Menriam-Webster.com. Merriam-Webster, n.d. Web. Apr. 5, 2016, 6 pages.
"Rope." Merriam-Webster.com. Merriam-Webster, n.d. Web. Apr. 5, 2016, 10 pages.
Specification and drawings for U.S. Appl. No. 15/062,669, filed Mar. 7, 2016, 44 pages.
Specification and drawings for U.S. Appl. No. 15/138,327 filed Apr. 26, 2016, 59 pages.
Specification and drawings for U.S. Appl. No. 15/138,378 filed Apr. 26, 2016, 43 pages.
Specification and drawings for U.S. Appl. No. 15/138,408, filed Apr. 26, 2016, 43 pages.
Specification and drawings for U.S. Appl. No. 15/138,449 filed Apr. 26, 2016, 56 pages.
Specification and drawings for Patent Application No. PCT/US16/29314 filed Apr. 26, 2016, 55 pages.
Specification and drawings for U.S. Appl. No. 15/138,685 filed Apr. 26, 2016, 64 pages.
Specification and drawings for U.S. Appl. No. 15/138,968 filed Apr. 26, 2016, 107 pages.
Specification and drawings for U.S. Appl. No. 14/698,578, filed Apr. 28, 2015, 36 pages.
Specification and drawings for Patent Application No. PCT/US16/29357 filed Apr. 26, 2016, 50 pages.
Specification and drawings for Patent Application No. PCT/US15/38248 filed Jun. 29, 2015, 39 pages.
Monosol; "Film Data Sheet", product information brochure, dated Mar. 6, 2012, 1 page.
Specification and drawings for U.S. Appl. No. 15/296,342, filed Oct. 18, 2016, 120 pages.
Specification and drawings for PCT Patent Application No. PCT/US16/57514, filed Oct. 18, 2016, 120 pages.
Office Action dated May 5, 2017 for U.S. Appl. No. 15/347,535, 20 pages.
Office Action dated May 9, 2017 for U.S. Appl. No. 15/138,685, 42 pages.
Office Action dated May 12, 2017 for U.S. Appl. No. 15/296,342, 23 pages.
Office Action dated Jul. 11, 2017 for U.S. Appl. No. 151622,016, 16 pages.
Office Action dated Jul. 13, 2017 for U.S. Appl. No. 15/615,136, 13 pages.
Office Action dated Jul. 14, 2017 for U.S. Appl. No. 15/391,014, 24 pages.
Office Action dated Jul. 17. 2017 for U.S. Appl. No. 15/138,685, 21 pages.

(56) References Cited

OTHER PUBLICATIONS

"Yarn"; Definition of Yarn by Merriam-Webster.com, Merrian-Webster, n.d. Web., Aug. 11, 2017, 6 pages.
Specification and Drawings for U.S. Appl. No. 15/567,779, filed Oct. 19, 2017, 63 pages.
Office Action issued Nov. 3, 2017 for U.S. Appl. No. 15/138,685, 15 pages.
Office Action dated Nov. 7, 2017 for U.S. Appl. No. 15/162,334, 16 pages.
Office Action dated Nov. 13, 2017 for U.S. Appl. No. 15/622,016, 44 pages.
Office Action dated Nov. 13, 2017 for U.S. Appl. No. 15/615,136, 34 pages.
Examiner's Answer dated Nov. 15, 2017 for U.S. Appl. No. 15/347,535, 14 pages.
International Search Report with Written Opinion dated Mar. 27, 2018 for PCT Patent Application No. PCT/US2017/065544, 16 pages.
Office Action dated Apr. 16, 2019 for U.S. Appl. No. 16/238,800, 30 pages.

\* cited by examiner

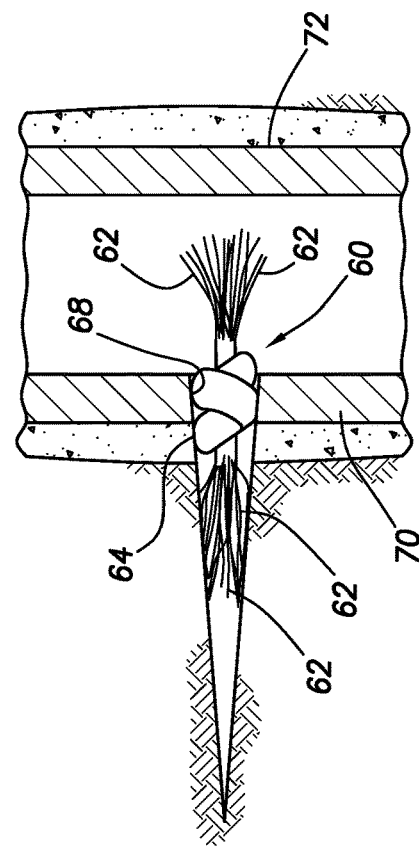
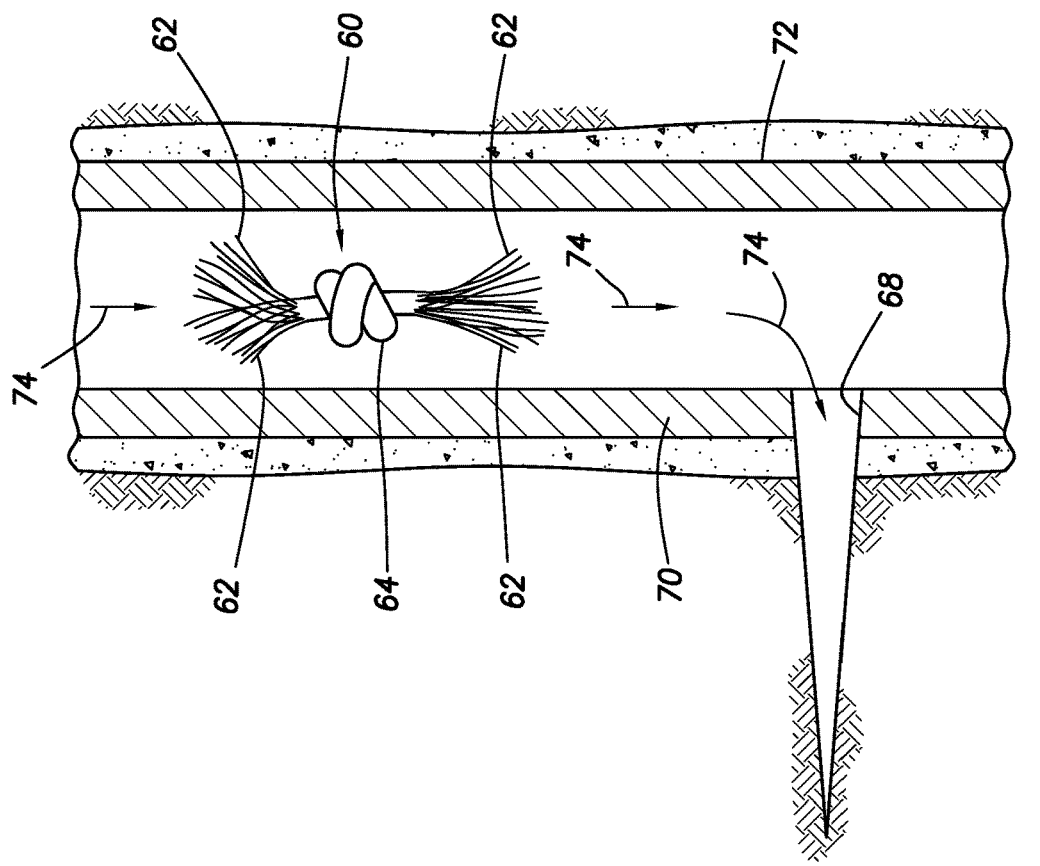

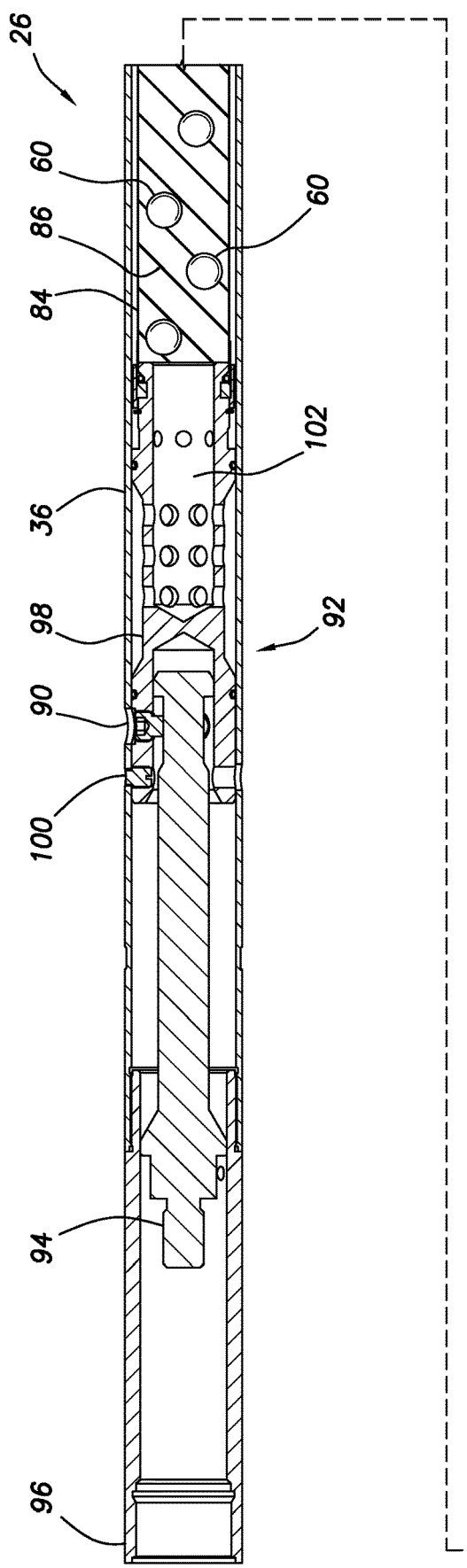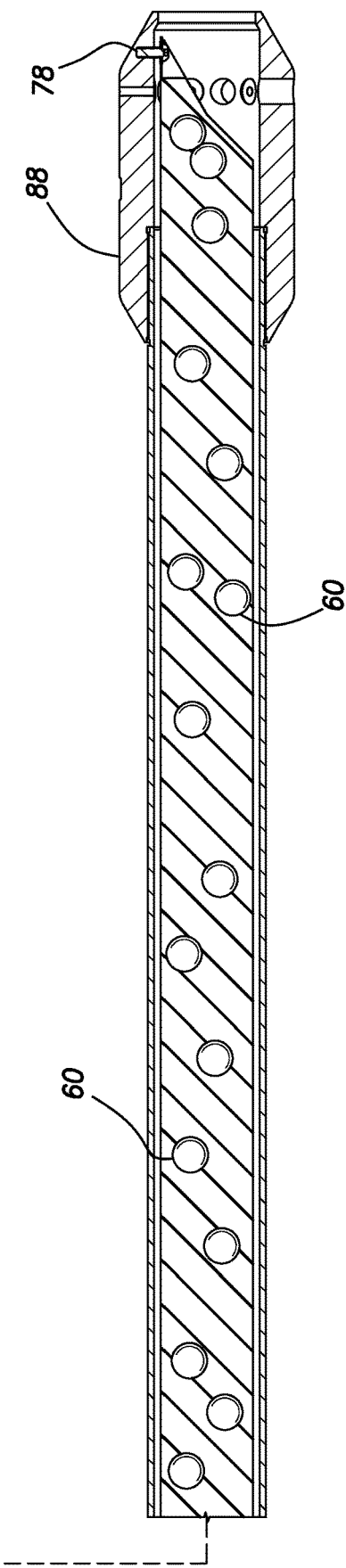
FIG.12A

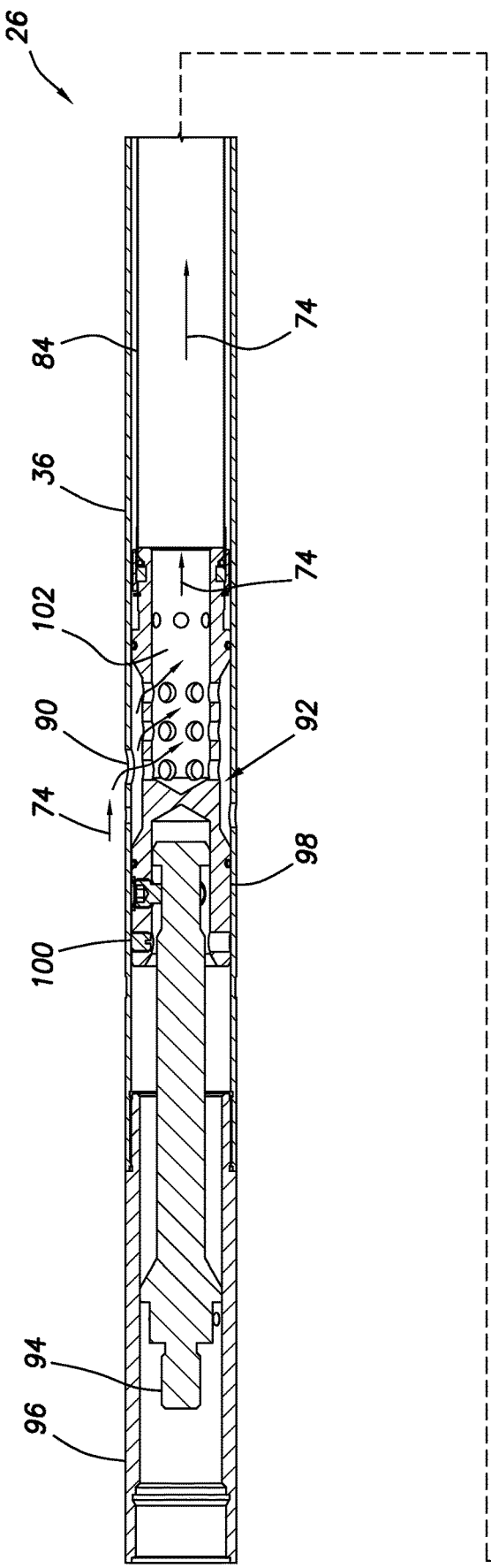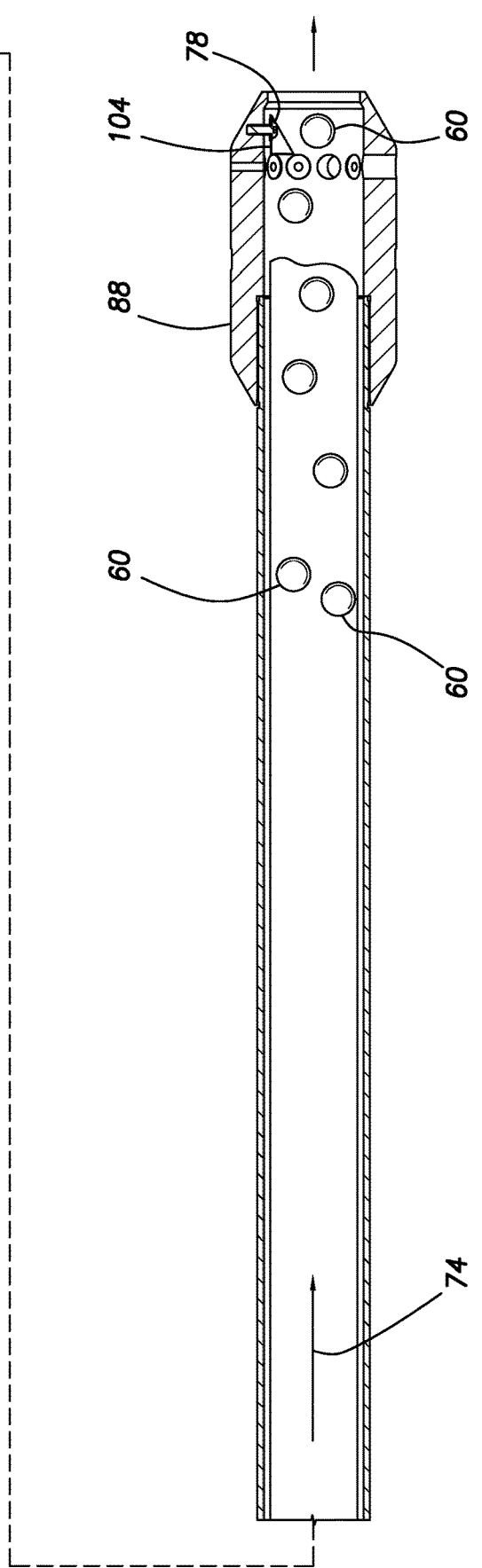
FIG.12B

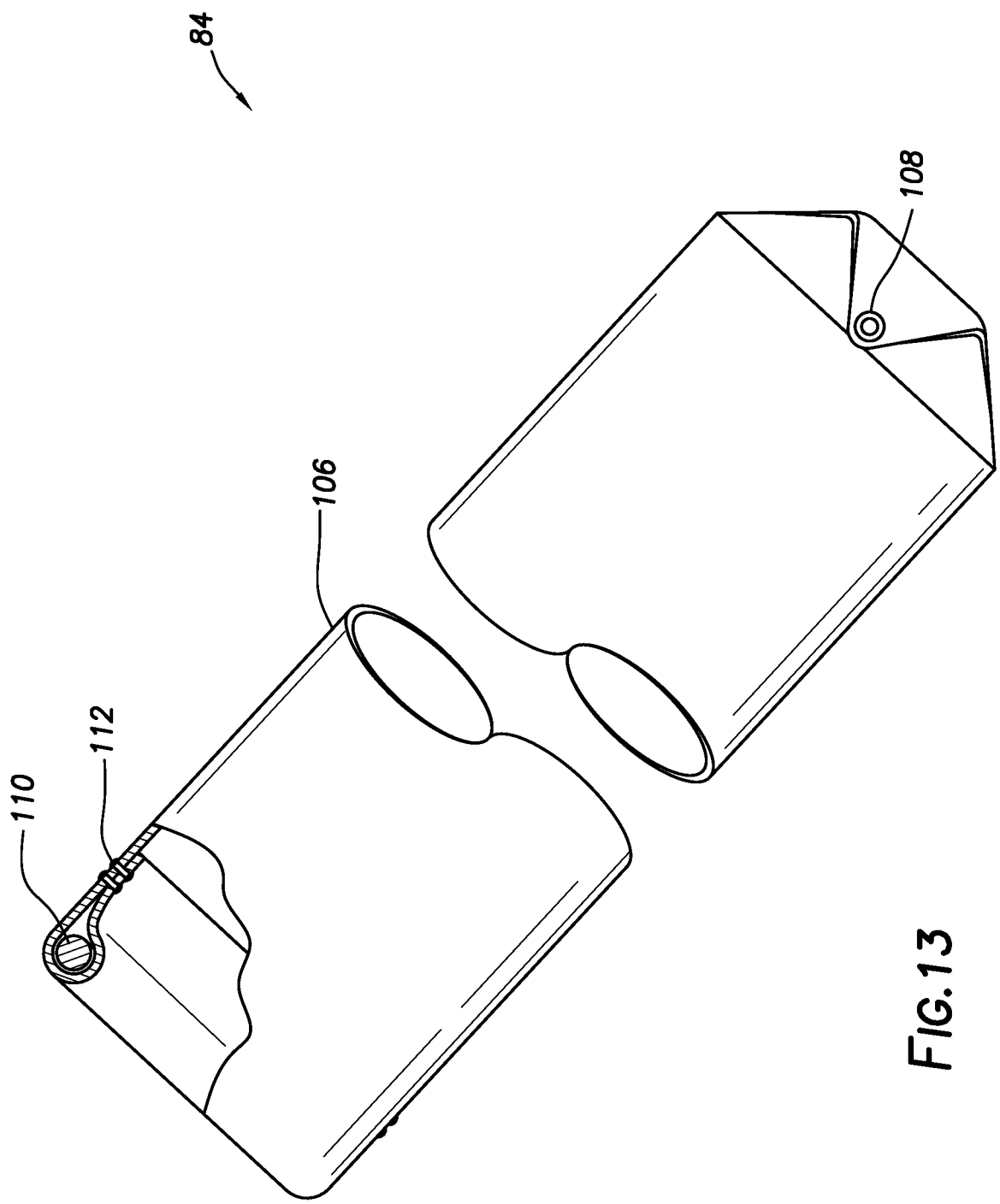

METHODS OF COMPLETING A WELL AND APPARATUS THEREFOR

CROSS-REFERENCE TO RELATED APPLICATION

This application claims the benefit of the filing date of U.S. provisional application No. 62/433,459 filed on 13 Dec. 2016. The entire disclosure of this prior application is incorporated herein by this reference.

BACKGROUND

This disclosure relates generally to equipment utilized and operations performed in conjunction with a subterranean well and, in examples described below, more particularly provides methods and apparatus for completing a well.

It can be beneficial to be able to control how and where fluid flows in a well. For example, it may be desirable in some circumstances to be able to prevent fluid from flowing into a particular formation zone. As another example, it may be desirable in some circumstances to cause fluid to flow into a particular formation zone, instead of into another formation zone. As yet another example, it may be desirable to temporarily prevent fluid from flowing through a passage of a well tool. Therefore, it will be readily appreciated that improvements are continually needed in the art of controlling fluid flow in wells.

BRIEF DESCRIPTION OF THE DRAWINGS

FIGS. 6A & B are representative partially cross-sectional views of the flow conveyed plugging device in a well, the device being conveyed by flow in FIG. 6A, and engaging a casing opening in FIG. 6B.

FIGS. 12A & B are representative cross-sectional views of an example of the dispensing tool in respective run-in and actuated configurations.

FIG. 13 is a representative perspective view of an example of an enclosure of the dispensing tool.

DETAILED DESCRIPTION

Figure 1:
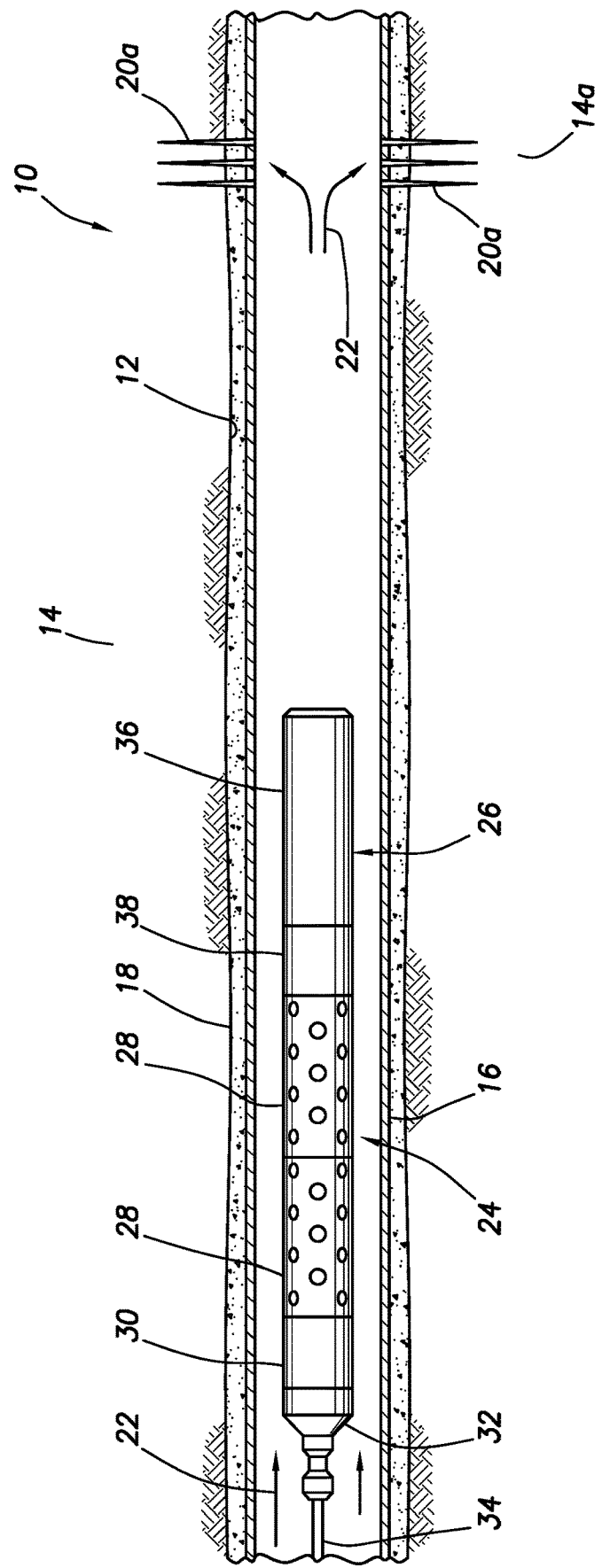
FIG. 1 is a representative partially cross-sectional view of an example of a well system and associated method which can embody principles of this disclosure, wherein a perforating assembly is being displaced into a well.

Example methods described below allow existing fluid passageways to be blocked permanently or temporarily in a variety of different applications. Certain flow conveyed plugging device examples described below can be made of a fibrous material and may comprise a central body, a "knot" or other enlarged geometry.

The devices may be conveyed into the passageways or leak paths using pumped fluid. Fibrous material extending outwardly from a body of a device can "find" and follow the fluid flow, pulling the enlarged geometry or fibers into a restricted portion of a flow path, causing the enlarged geometry and additional strands to become tightly wedged into the flow path, thereby sealing off fluid communication.

The devices can be made of degradable or non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time using a form of well intervention, such as, by spotting or circulating a fluid in the well so that the material is exposed to the fluid.

In some examples, the material can be an acid degradable material (e.g., nylon, etc.), a mix of acid degradable material (for example, nylon fibers mixed with particulate such as calcium carbonate), self-degrading material (e.g., poly-lactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

Multiple materials can be pumped together or separately. For example, nylon and calcium carbonate could be pumped as a mixture, or the nylon could be pumped first to initiate a seal, followed by calcium carbonate to enhance the seal.

In certain examples described below, the device can be made of knotted fibrous materials. Multiple knots can be used with any number of loose ends. The ends can be frayed or un-frayed. The fibrous material can be rope, fabric, metal wool, cloth or another woven or braided structure.

The device can be used to block open sleeve valves, perforations or any leak paths in a well (such as, leaking connections in casing, corrosion holes, etc.). Any opening or passageway through which fluid flows can be blocked with a suitably configured device. For example, an intentionally or inadvertently opened rupture disk, or another opening in a well tool, could be plugged using the device.

Previously described plugging devices can be used in the methods described herein, along with several different apparatuses and methods for deploying and placing the plugging devices at desired locations within the well. Descriptions of fibrous and/or degradable plugging devices are in US publication nos. 2016/0319628, 2016/0319630 and 2016/0319631, and in International application nos. PCT/US15/38248 (filed 29 Jun. 2015) and PCT/US16/29357 (filed 26 Apr. 2016). The entire disclosures of these prior applications are incorporated herein by this reference.

In one example method described below, a well with an existing perforated zone can be re-completed. Devices (either degradable or non-degradable) are conveyed by flow to plug all existing perforations.

The well can then be re-completed using any desired completion technique. If the devices are degradable, a degrading treatment can then be placed in the well to open up the plugged perforations (if desired).

In another example method described below, multiple formation zones can be perforated and fractured (or otherwise stimulated, such as, by acidizing) in a single trip of a bottom hole assembly into the well. In the method, one zone is perforated, the zone is stimulated, and then the perforated zone is plugged using one or more devices.

These steps are repeated for each additional zone, except that a last zone may not be plugged. All of the plugged zones are eventually unplugged by waiting a certain period of time (if the devices are self-degrading), by applying an appropriate degrading treatment, or by mechanically removing the devices.

In another example, flow of fluid into previously fractured zones is blocked using flow conveyed plugging devices instead of a drillable plug. The plugging devices are carried into a wellbore via a tool in a perforating assembly. The plugging devices are then released in the wellbore. The method generally consists of the following steps:

1. Establish a flow path through the wellbore (for example, by providing one or more openings at a "toe" or distal end of the wellbore, e.g., via coiled tubing perforations, a pressure operated toe valve, a wet shoe, etc.), so fluid can be pumped through the wellbore, allowing the perforating assembly to be pumped down the cased wellbore.
2. Pump the perforating assembly to above (less depth along the wellbore) the topmost open perforations in the wellbore. The perforating assembly includes (from bottom to top) a plugging device dispensing tool, one or more perforators, a controller/firing head, and a connector for a conveyance used to convey the assembly into the wellbore.
3. Operate an actuator of the plugging device dispensing tool to release the plugging devices into the wellbore above the topmost open perforations. The actuator may be operated using various techniques, such as, electrically, hydraulically, by pipe manipulation, by applying set down weight, by igniting a propellant, by detonating an explosive, etc.
4. Move the perforating assembly up hole to one or more additional desired locations (to shallower depths along the wellbore) and operate perforators to create perforations at the one or more locations within the cased wellbore. If jointed or coiled tubing is used to convey the perforating assembly, the controller/firing head may be pressure actuated to detonate explosive shaped charges of the perforator, or an abrasive jet perforator may be used.
5. Retrieve the perforating assembly from the wellbore.
6. Perform fracturing operations to fracture the formation(s) penetrated by the open perforations, and deliver sand slurry (e.g., proppant) to fractured formation(s).
7. Pump "flush" of sand-free fluid from surface to push any remaining sand out of the wellbore and into the fractured formation(s) via the open perforations.
8. Repeat steps 2-7 until all desired zones are fractured.

The above method can also be used in conjunction with a conventional "plug and perf" technique, in which drillable bridge plugs are installed in a cased wellbore above previously fractured zone(s).

The plugging device dispensing tool used to convey the plugging devices into the wellbore can comprise a canister or other container which is loaded with plugging devices and conveyed into the well with the perforating assembly. Of course, any means of conveyance can be used to convey the perforating assembly (for example, wireline, coiled tubing, jointed pipe, slickline, etc.).

Some suitable embodiments and methods for carrying plugging devices into the wellbore are listed below. In addition, any of the methods and dispensing apparatuses described in US patent application publication no. 2016/0348467 may be used. The entire disclosure of this prior application is incorporated herein by this reference for all purposes.

1. In one example, the plugging devices are dispensed using an auger type element driven by an electric motor. In this example, the number of devices dispensed is dependent on the run time and speed of the electric motor, and a configuration of the auger.
2. In another example, the plugging devices are carried in a tube with a frangible disk closing off a bottom of the tube. The disk can be broken so that fluid pumped past the dispensing tool, or upward movement of the dispensing tool, creates a pressure differential to push the plugging devices out of the tool. The disk can be broken using:
    a. Pyrotechnic explosive (for instance a blasting cap or detonator as used in dispensing tool 26).
    b. Fluid pressure generated by the dispensing tool.
    c. Mechanical impact caused by the dispensing tool.
    d. Any other shock-inducing or cutting action.
3. In another example, the plugging device dispensing tool comprises a canister or chamber having an initially closed opening or valve which can be mechanically operated to an open position. In the open position, the plugging devices are allowed to exit from the canister or chamber. The plugging devices can be forcibly discharged, or a pressure differential can be generated across the canister/chamber by pumping fluid past the tool, or the tool can be moved within the wellbore. The opening can be anywhere on the tool, such as, at the bottom, or along a side of the canister.
4. In another example, the plugging devices are dispensed in a "slurry" which is pumped from the dispensing tool to the wellbore using an electrically driven pump.
5. In another example, the plugging devices are initially contained in a sack or bag, which is mechanically opened downhole in response to applied pressure. A pressure differential can be generated across the canister/chamber by pumping fluid past the tool, or the tool can be moved within the wellbore.
6. Some of the dispensing tool examples described above can be adapted to use a standard bridge plug setting tool as the motive means to operate the dispensing tool. This would allow widely used, industry standard setting tools to be used with little or no modification to operate the dispensing tool(s). In this case, the plugging device dispensing tool will have a mechanical interface which is practically identical to industry standard drillable bridge plugs.

In another method, flow of fluid into previously fractured zones is blocked using flow conveyed plugging devices, instead of a drillable bridge plug. The plugging devices are pumped from the surface into the wellbore ahead of the perforating assembly, and as the perforating assembly is being pumped through the wellbore.

The perforating assembly is stopped above open perforations that were fractured in a previous stage, or another opening that provides for flow through the wellbore. The plugging devices are pumped beyond the perforating assembly location and into the open perforations or other openings to block flow into the perforations or openings during the next fracturing step. The method generally consists of the following steps:

1. Establish a flow path through the wellbore (for example, by providing one or more openings at a "toe" or distal end of the wellbore, e.g., via coiled tubing perforations, a pressure operated toe valve, a wet shoe, etc.), so fluid can be pumped through the wellbore, allowing the perforating assembly to be pumped down the cased wellbore.
2. Pump plugging devices from surface into the wellbore slightly ahead of the perforating assembly.
3. Pump perforating assembly to above the topmost open perforations or other openings in the wellbore, while at the same time pumping plugging devices just ahead of the perforating assembly. The perforating assembly can include (from bottom to top) one or more perforators, a controller/firing head, and a connector for a conveyance used to convey the assembly into the wellbore.
4. While holding the perforating assembly in place above the open perforations or other openings, continue pumping the plugging devices further into the wellbore until they land in the open perforations or openings below the perforating assembly and block further flow into the perforations or openings.
5. Move the perforating assembly up hole to one or more additional desired locations (to shallower depths along the wellbore) and operate perforators to create perforations at the one or more locations within the cased wellbore. If jointed or coiled tubing is used to convey the perforating assembly, the controller/firing head may be pressure actuated to detonate explosive shaped charges of the perforator, or an abrasive jet perforator may be used.
6. Retrieve the perforating assembly from the wellbore.
7. Perform fracturing operations to fracture the formation(s) penetrated by the open perforations, and deliver sand slurry (e.g., proppant) to fractured formation(s).
8. Repeat steps 2-7 until all desired zones are fractured.

The above method can also be used in conjunction with a conventional "plug and perf" technique, in which drillable bridge plugs are installed in a cased wellbore above previously fractured zone(s).

After a wellbore is completed using any of the methods described herein, the plugging devices may be removed in any of a number of ways including:
 a. Mechanical removal with a drilling assembly including a fluid motor conveyed on tubing.
 b. Mechanical removal with a gauge ring conveyed on tubing.
 c. Mechanical removal with a drilling assembly rotated from surface.
 d. Chemical removal by applying a degrading treatment (such as acid) "spotted" through tubing, or pumped from the surface.
 e. Waiting a prescribed amount of time if self-degrading plugging devices are used.

Note that none of the methods described herein are limited to hydraulic fracturing. They can also be applied to matrix treatments, such as matrix acidizing (carbonate or sandstone formations), and damage removal (e.g., scale, mud filtrate) with acid or chelants. Any type of stimulation treatment may be performed, instead of or in addition to fracturing, in keeping with the principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 has been drilled so that it penetrates an earth formation 14. The wellbore 12 is lined with casing 16 and cement 18, although in other examples one or more sections of the wellbore may be uncased or open hole.

The wellbore 12 as depicted in FIG. 1 is generally horizontal, and a "toe" or distal end of the wellbore is to the right of the figure. However, in other examples, the wellbore 12 could be generally vertical or inclined relative to vertical.

As used herein, the terms "above," "upward" and similar terms are used to refer to a direction toward the earth's surface along the wellbore 12, whether the wellbore is generally horizontal, vertical or inclined. Thus, in the FIG. 1 example, the upward direction is toward the left of the figure.

As depicted in FIG. 1, a set of perforations 20a have been formed through the casing 16, cement 18 and into a zone 14a of the formation 14. The perforations 20a provide for fluid communication between the zone 20a and an interior of the casing 16. Such fluid communication could be otherwise provided, such as, by use of a sliding sleeve valve (not shown) or other openings or ports through the casing 16.

The perforations 20a (or other openings) may be provided or formed in order to establish such fluid communication, so that a flow path extends longitudinally through the wellbore 12 and into the zone 14a. In some examples, the perforations 20a may be formed primarily to enable production flow from the zone 14a to the earth's surface via the wellbore 12.

The perforations 20a may be formed using any suitable technique, such as, perforating by explosive shaped charges or by discharge of an abrasive jet, or the perforations may exist in the casing 16 prior to the casing being installed in the wellbore 12 (for example, a perforated liner could be installed as part of the casing). Thus, the scope of this disclosure is not limited to any particular timing or technique for forming the perforations 20a.

In some examples, openings other than perforations may be available in the well for enabling fluid flow through the wellbore 12. Tools known to those skilled in the art as a "wet shoe" or a "toe valve" can provide openings at the distal end of the wellbore 12. Thus, the scope of this disclosure is not limited to any particular means of providing for fluid flow through the wellbore 12.

Note that it is not necessary in keeping with the principles of this disclosure for the perforations 20a or other openings to be formed at or near a distal end of the wellbore 12, or for any other procedures or steps described herein to be performed at or near a distal end of a wellbore.

In the FIG. 1 example, a fluid flow 22 is established longitudinally through the wellbore 12, outward through the perforations 20a and into the zone 14a. This fluid flow 22 is used to displace or "pump" a perforating assembly 24 through the wellbore 12. Note that the zone 14a may have been treated (for example, by acidizing, fracturing, injection of conformance agents, etc.) prior to establishing the fluid flow 22, or the fluid flow could be part of treating the zone 14a.

As depicted in FIG. 1, the perforating assembly 24 includes a plugging device dispensing tool 26, two perforators 28, a firing head 30, and a connector 32. The connector 32 is used to connect the perforating assembly 24 to a conveyance 34, such as, a wireline, a slickline, coiled tubing or jointed tubing.

The dispensing tool 26 in this example includes a container 36 and an actuator 38. The container 36 contains the plugging devices (not visible in FIG. 1, see FIG. 2), and the actuator 38 acts to release the plugging devices from the container in the wellbore 12. Any of the methods and dispensing apparatuses described in the US patent application publication no. 2016/0348467 mentioned above may be used for the container 36 and actuator 38.

The perforators 28 are depicted in FIG. 1 as being explosive shaped charge perforating guns. Shaped charges in the perforating guns are detonated by means of the firing head 30, which may be operated in response to a predetermined pressure, pressure pulse, acoustic, electric, hydraulic, optical or other type of signal.

Alternatively, the perforators 28 could comprise one or more abrasive jet perforators (for example, if the conveyance 34 is a coiled or jointed tubing). The scope of this disclosure is not limited to use of any particular type of perforator.

The fluid flow 22 displaces the perforating assembly 24 through the wellbore 12 to a desired location. In this example, the desired location is a position above the perforations 20a. In other examples, gravity or another source of a biasing force could be used to displace the perforating assembly 24 through the wellbore 12 (e.g., if the wellbore is vertical or inclined, or if a downhole tractor is used), and/or the perforating assembly may be displaced to another desired location.

Figure 2:
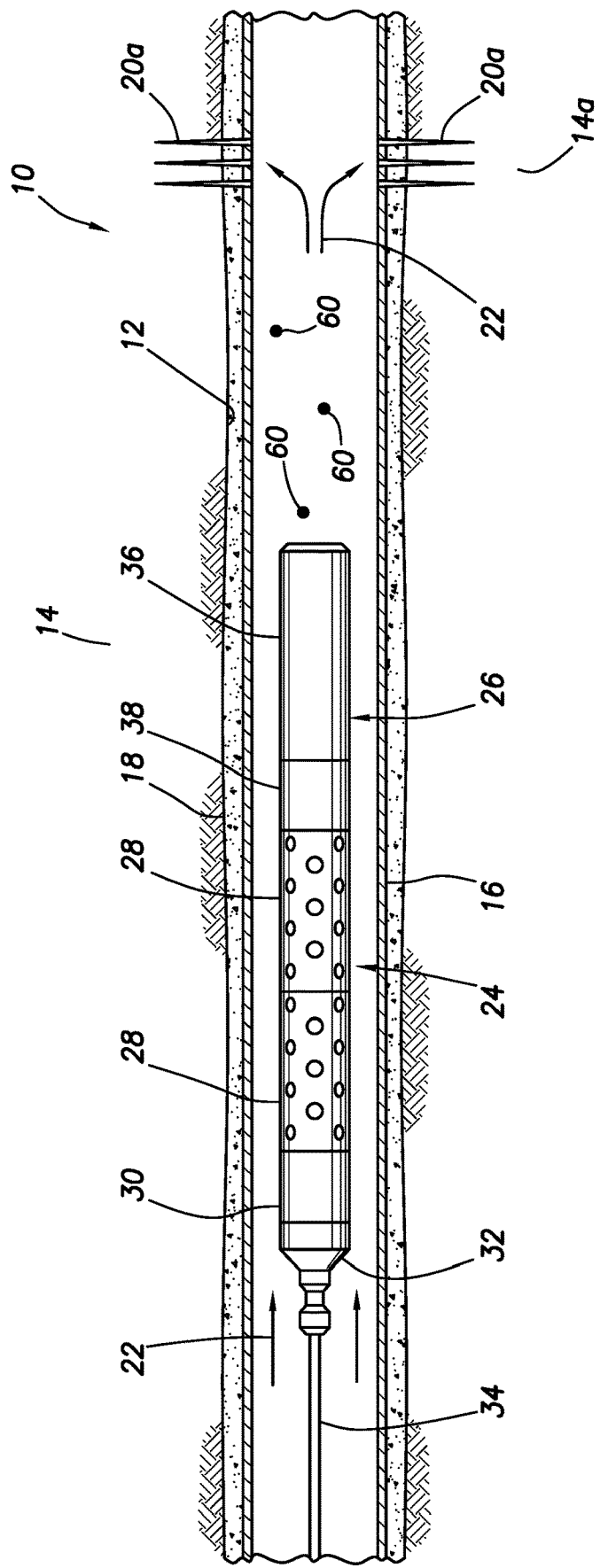
FIG. 2 is a representative partially cross-sectional view of the system and method of FIG. 1, wherein flow conveyed plugging devices are being released from a container of the perforating assembly.

Referring additionally now to FIG. 2, the system 10 and method are representatively illustrated after the perforating assembly 24 has been displaced to the desired location above the open perforations 20a, and the dispensing tool 26 has been operated to release the plugging devices 60 into the wellbore 12 above the perforations. The fluid flow 22 displaces the plugging devices 60 through the wellbore 12 toward the open perforations 20a.

Any number of the plugging devices 60 may be released from the tool 26. In various examples, the number of plugging devices 60 released could be equal to, less than, or greater than, the number of open perforations 20a.

An equal number of open perforations 20a and plugging devices 60 may be used if it is desired to plug all of the perforations and not have excess plugging devices remaining in the wellbore 12. A greater number of plugging devices 60 may be used if it is desired to ensure that there are more than an adequate number of plugging devices to plug all of the perforations 20a. A fewer number of plugging devices 60 may be used if it is desired to maintain a capability for flowing fluid downward through the wellbore 12 after most of the perforations 20a have been plugged.

Figure 3:
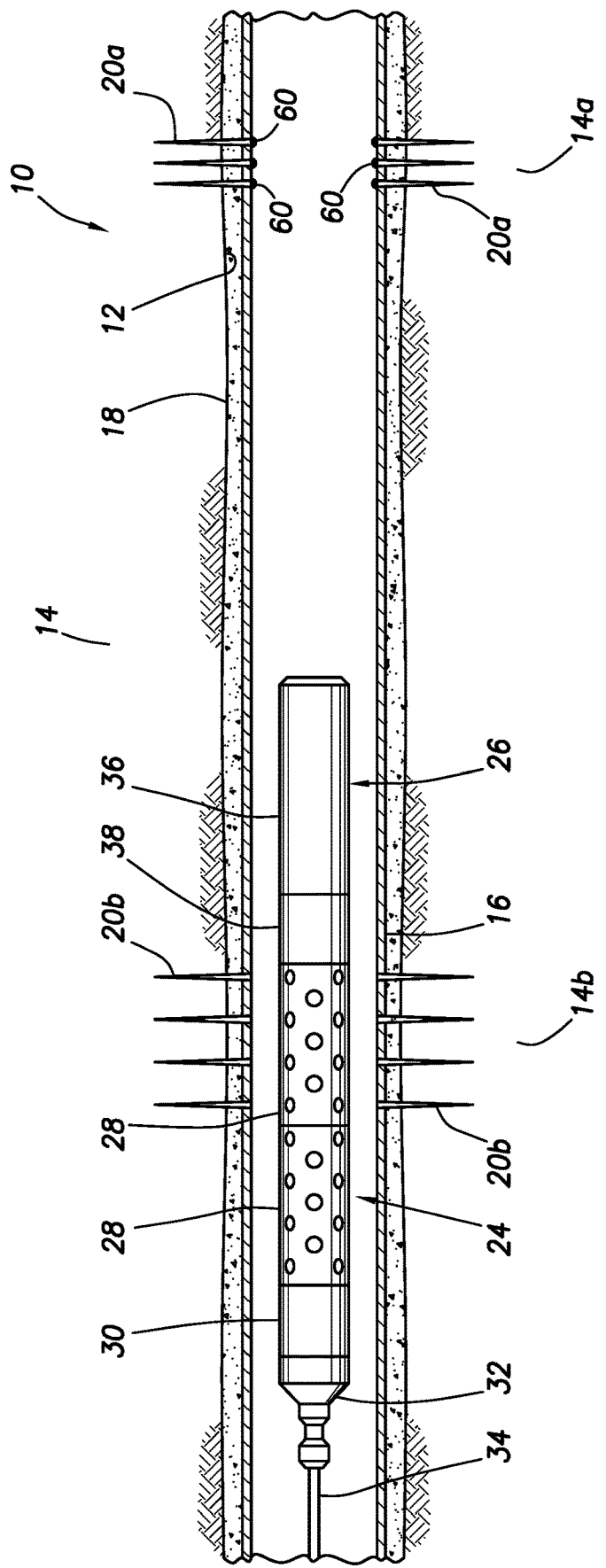
FIG. 3 is a representative partially cross-sectional view of the system and method, wherein a formation zone is perforated.

Referring additionally now to FIG. 3, the system 10 and method are representatively illustrated after the plugging devices 60 have sealingly engaged and prevent fluid flow into the perforations 20a. The perforating assembly 24 has been raised in the wellbore 12 to another location where it is desired to perforate another zone 14b of the formation 14, and perforations 20b have been formed through the casing 16 and cement 18 by the perforating assembly.

Fluid communication is now permitted between the zone 14b and the interior of the casing 16. Additional perforations may be formed at other locations along the wellbore 12 using the perforating assembly 24, if desired. The perforating assembly 24 can then be retrieved from the wellbore 12, and the zone 14b (and any other perforated zone(s)) can be treated (for example, by fracturing, acidizing, injection of conformance agents, etc.).

The steps described above and depicted in FIGS. 1-3 can be repeated multiple times, until all desired zones have been perforated and treated. At that point, the plugging devices 60 can be degraded or otherwise removed from the perforations or other openings, so that fluid communication is permitted between the various zones and the interior of the casing 16.

Figure 4A:
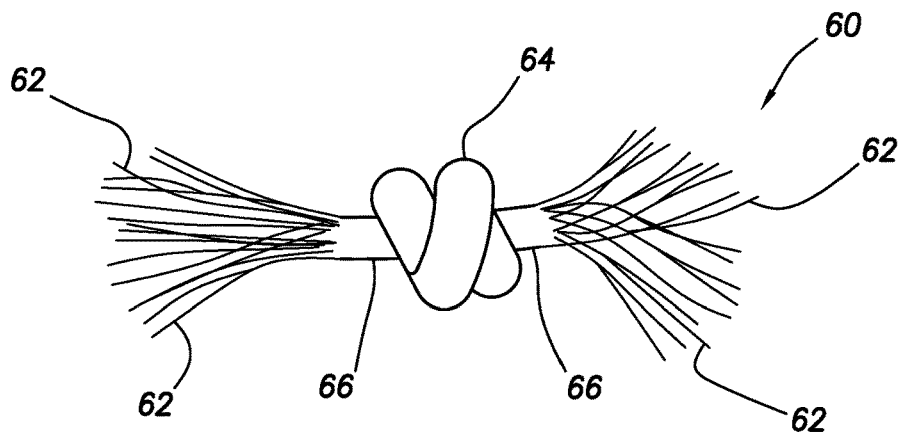
FIGS. 4A & B are enlarged scale representative elevational views of examples of a flow conveyed plugging device that may be used in the system and method of FIGS. 1-3, and which can embody the principles of this disclosure.

Referring additionally now to FIG. 4A, an example of a flow conveyed plugging device 60 that can incorporate the principles of this disclosure is representatively illustrated. The device 60 may be used for any of the plugging devices in the method examples described herein, or the device may be used in other methods.

The device 60 example of FIG. 4A includes multiple fibers 62 extending outwardly from an enlarged body 64. As depicted in FIG. 4A, each of the fibers 62 has a lateral dimension (e.g., a thickness or diameter) that is substantially smaller than a size (e.g., a thickness or diameter) of the body 64.

The body 64 can be dimensioned so that it will effectively engage and seal off a particular opening in a well. For example, if it is desired for the device 60 to seal off a perforation in a well, the body 64 can be formed so that it is somewhat larger than a diameter of the perforation. If it is desired for multiple devices 60 to seal off multiple openings having a variety of dimensions (such as holes caused by corrosion of the casing 16), then the bodies 64 of the devices can be formed with a corresponding variety of sizes.

In the FIG. 4A example, the fibers 62 are joined together (e.g., by braiding, weaving, cabling, etc.) to form lines 66 that extend outwardly from the body 64. In this example, there are two such lines 66, but any number of lines (including one) may be used in other examples.

The lines 66 may be in the form of one or more ropes, in which case the fibers 62 could comprise frayed ends of the rope(s). In addition, the body 64 could be formed by one or more knots in the rope(s). In some examples, the body 64 can comprise a fabric or cloth, the body could be formed by one or more knots in the fabric or cloth, and the fibers 62 could extend from the fabric or cloth.

In other examples, the device 60 could comprise a single sheet of material, or multiple strips of sheet material. The device 60 could comprise one or more films. The body 64 and lines 66 may not be made of the same material, and the body and/or lines may not be made of a fibrous material.

In the FIG. 4A example, the body 64 is formed by a double overhand knot in a rope, and ends of the rope are frayed, so that the fibers 62 are splayed outward. In this manner, the fibers 62 will cause significant fluid drag when the device 60 is deployed into a flow stream, so that the device will be effectively "carried" by, and "follow," the flow.

However, it should be clearly understood that other types of bodies and other types of fibers may be used in other examples. The body 64 could have other shapes, the body could be hollow or solid, and the body could be made up of one or multiple materials. The fibers 62 are not necessarily joined by lines 66, and the fibers are not necessarily formed by fraying ends of ropes or other lines. The body 64 is not necessarily centrally located in the device 60 (for example, the body could be at one end of the lines 66). Thus, the scope of this disclosure is not limited to the construction, configuration or other details of the device 60 as described herein or depicted in the drawings.

Figure 4B:
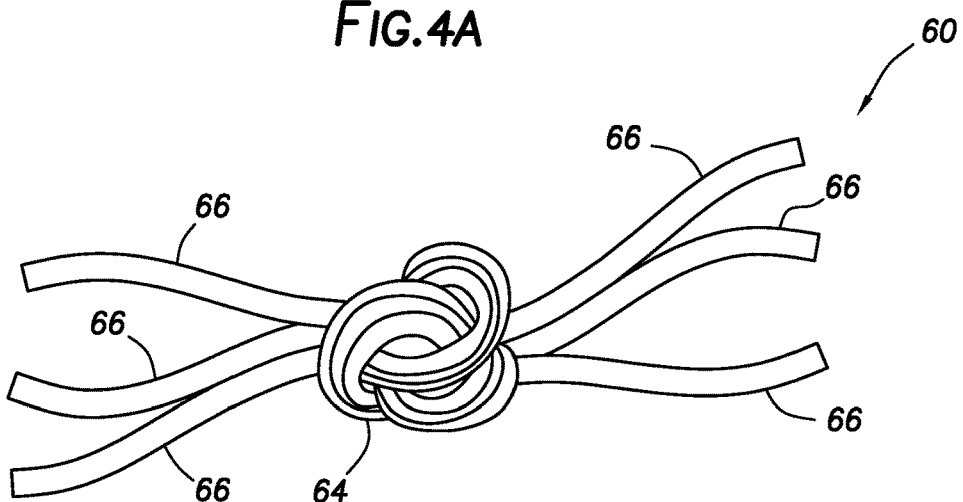

Referring additionally now to FIG. 4B, another example of the device 60 is representatively illustrated. In this example, the device 60 is formed using multiple braided lines 66 of the type known as "mason twine." The multiple lines 66 are knotted (such as, with a double or triple overhand knot or other type of knot) to form the body 64.

Ends of the lines 66 are not necessarily frayed in these examples, although the lines do comprise fibers (such as the fibers 62 described above).

Figure 5:
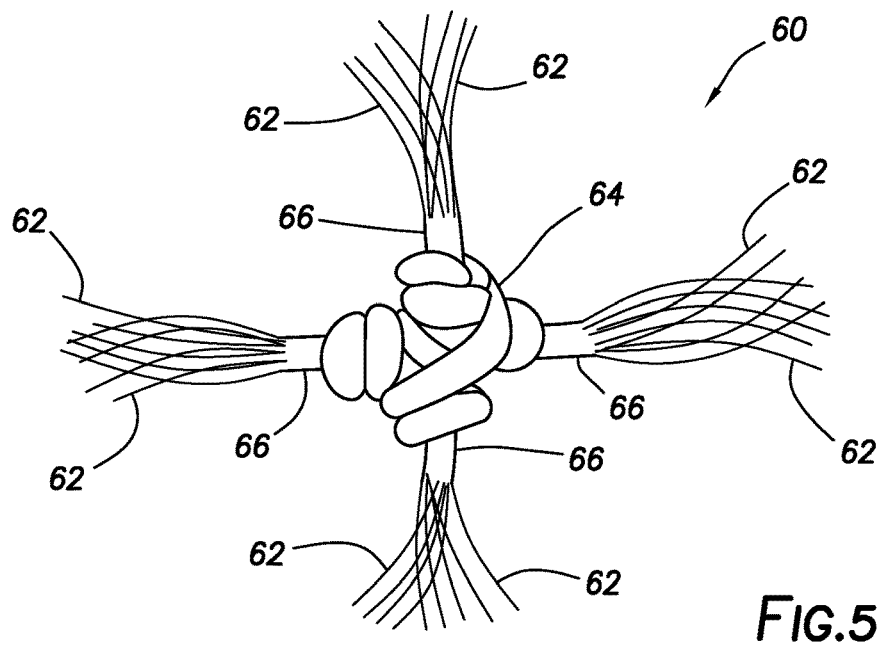
FIG. 5 is a representative elevational view of another example of the flow conveyed plugging device.

Referring additionally now to FIG. 5, another example of the device 60 is representatively illustrated. In this example, four sets of the fibers 62 are joined by a corresponding number of lines 66 to the body 64. The body 64 is formed by one or more knots in the lines 66.

FIG. 5 demonstrates that a variety of different configurations are possible for the device 60. Accordingly, the principles of this disclosure can be incorporated into other configurations not specifically described herein or depicted in the drawings. Such other configurations may include fibers joined to bodies without use of lines, bodies formed by techniques other than knotting, etc.

Referring additionally now to FIGS. 6A & B, an example of a use of the device 60 of FIG. 4A to seal off an opening 68 in a well is representatively illustrated. In this example, the opening 68 is a perforation formed through a sidewall 70 of a tubular string 72 (such as, a casing, liner, tubing, etc.). However, in other examples the opening 68 could be another type of opening, and may be formed in another type of structure.

The device 60 is deployed into the tubular string 72 and is conveyed through the tubular string by fluid flow 74. The fibers 62 of the device 60 enhance fluid drag on the device, so that the device is influenced to displace with the flow 74.

The fluid flow 74 may be the same as, or similar to, the fluid flow 22 described above for the example of FIGS. 1-3. However, the fluid flow 74 could be another type of fluid flow, in keeping with the principles of this disclosure.

Since the flow 74 (or a portion thereof) exits the tubular string 72 via the opening 68, the device 60 will be influenced by the fluid drag to also exit the tubular string via the opening 68. As depicted in FIG. 6B, one set of the fibers 62 first enters the opening 68, and the body 64 follows. However, the body 64 is appropriately dimensioned, so that it does not pass through the opening 68, but instead is lodged or wedged into the opening. In some examples, the body 64 may be received only partially in the opening 68, and in other examples the body may be entirely received in the opening.

The body 64 may completely or only partially block the flow 74 through the opening 68. If the body 64 only partially blocks the flow 74, any remaining fibers 62 exposed to the flow in the tubular string 72 can be carried by that flow into any gaps between the body and the opening 68, so that a combination of the body and the fibers completely blocks flow through the opening.

In another example, the device 60 may partially block flow through the opening 68, and another material (such as, calcium carbonate, poly-lactic acid (PLA) or poly-glycolic acid (PGA) particles) may be deployed and conveyed by the flow 74 into any gaps between the device and the opening, so that a combination of the device and the material completely blocks flow through the opening.

The device 60 may permanently prevent flow through the opening 68, or the device may degrade to eventually permit flow through the opening. If the device 60 degrades, it may be self-degrading, or it may be degraded in response to any of a variety of different stimuli. Any technique or means for degrading the device 60 (and any other material used in conjunction with the device to block flow through the opening 68) may be used in keeping with the scope of this disclosure.

In other examples, the device 60 may be mechanically removed from the opening 68. For example, if the body 64 only partially enters the opening 68, a mill or other cutting device may be used to cut the body from the opening.

Figure 7:
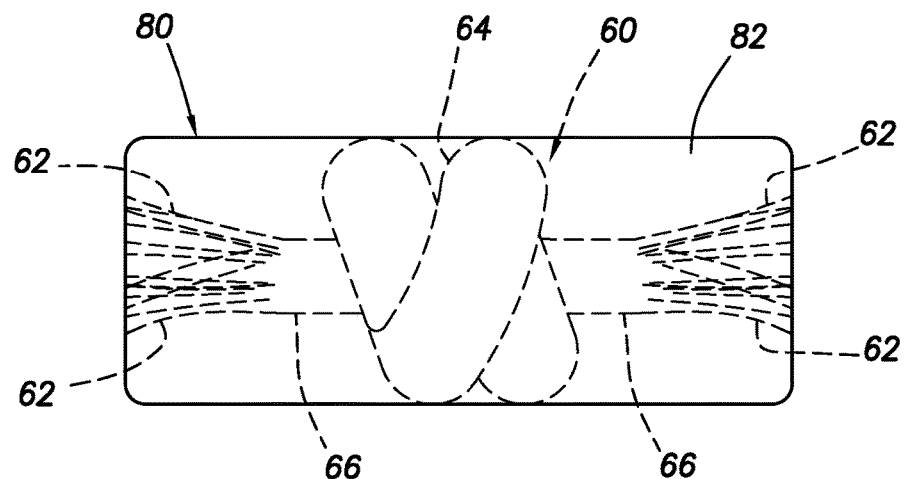
FIGS. 7-9 are representative elevational views of examples of the flow conveyed plugging device with a retainer.
Figure 8:
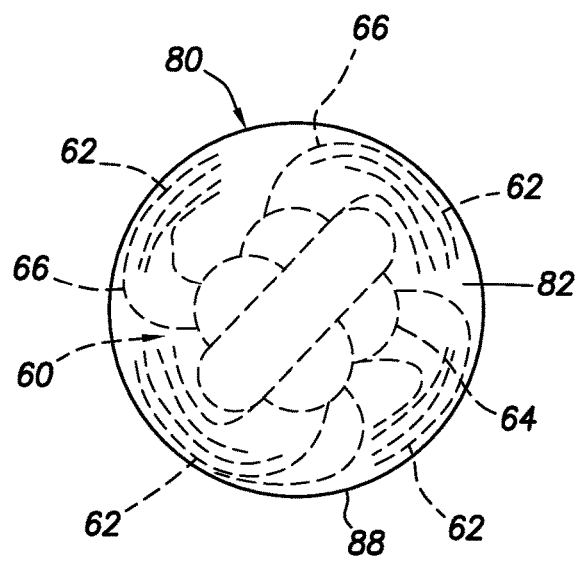
Figure 9:
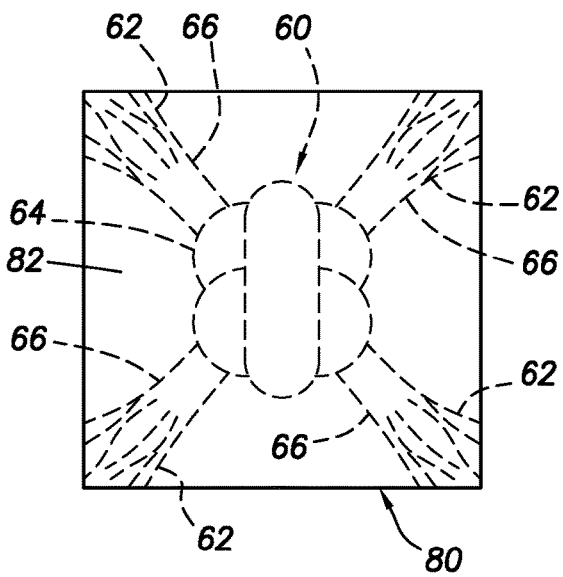

Referring additionally now to FIGS. 7-9, additional examples of the device 60 are representatively illustrated. In these examples, the device 60 is surrounded by, encapsulated in, molded in, or otherwise retained by, a retainer 80.

The retainer 80 aids in deployment of the device 60, particularly in situations where multiple devices are to be deployed simultaneously. In such situations, the retainer 80 for each device 60 prevents the fibers 62 and/or lines 66 from becoming entangled with the fibers and/or lines of other devices.

The retainer 80 could in some examples completely enclose the device 60. In other examples, the retainer 80 could be in the form of a binder that holds the fibers 62 and/or lines 66 together, so that they do not become entangled with those of other devices.

In some examples, the retainer 80 could have a cavity therein, with the device 60 (or only the fibers 62 and/or lines 66) being contained in the cavity. In other examples, the retainer 80 could be molded about the device 60 (or only the fibers 62 and/or lines 66).

During or after deployment of the device 60 into the well, the retainer 80 dissolves, melts, disperses or otherwise degrades, so that the device is capable of sealing off an opening 68 in the well, as described above. For example, the retainer 80 can be made of a material 82 that degrades in a wellbore environment.

The retainer material 82 may degrade after deployment into the well, but before arrival of the device 60 at the opening 68 to be plugged. In other examples, the retainer material 82 may degrade at or after arrival of the device 60 at the opening 68 to be plugged. If the device 60 also comprises a degradable material, then preferably the retainer material 82 degrades prior to the device material.

The material 82 could, in some examples, melt at elevated wellbore temperatures. The material 82 could be chosen to have a melting point that is between a temperature at the earth's surface and a temperature at the opening 68, so that the material melts during transport from the surface to the downhole location of the opening.

The material 82 could, in some examples, dissolve when exposed to wellbore fluid. The material 82 could be chosen so that the material begins dissolving as soon as it is deployed into the wellbore 14 and contacts a certain fluid (such as, water, brine, hydrocarbon fluid, etc.) therein. In other examples, the fluid that initiates dissolving of the material 82 could have a certain pH range that causes the material to dissolve.

Note that it is not necessary for the material 82 to melt or dissolve in the well. Various other stimuli (such as, passage of time, elevated pressure, flow, turbulence, etc.) could cause the material 82 to disperse, degrade or otherwise cease to retain the device 60. The material 82 could degrade in response to any one, or a combination, of: passage of a predetermined period of time in the well, exposure to a predetermined temperature in the well, exposure to a predetermined fluid in the well, exposure to radiation in the well and exposure to a predetermined chemical composition in the well. Thus, the scope of this disclosure is not limited to any particular stimulus or technique for dispersing or degrading the material 82, or to any particular type of material.

In some examples, the material 82 can remain on the device 60, at least partially, when the device engages the opening 68. For example, the material 82 could continue to cover the body 64 (at least partially) when the body engages and seals off the opening 68. In such examples, the material 82 could advantageously comprise a relatively soft, viscous and/or resilient material, so that sealing between the device 60 and the opening 68 is enhanced.

Suitable relatively low melting point substances that may be used for the material 82 can include wax (e.g., paraffin wax, vegetable wax), ethylene-vinyl acetate copolymer (e.g., ELVAX™ available from DuPont), atactic polypropylene, and eutectic alloys. Suitable relatively soft substances that may be used for the material 82 can include a soft silicone composition or a viscous liquid or gel.

Suitable dissolvable materials can include PLA, PGA, anhydrous boron compounds (such as anhydrous boric oxide and anhydrous sodium borate), polyvinyl alcohol, polyethylene oxide, salts and carbonates. The dissolution rate of a water-soluble polymer (e.g., polyvinyl alcohol, polyethylene oxide) can be increased by incorporating a water-soluble plasticizer (e.g., glycerin), or a rapidly-dissolving salt (e.g., sodium chloride, potassium chloride), or both a plasticizer and a salt.

In FIG. 7, the retainer 80 is in a cylindrical form. The device 60 is encapsulated in, or molded in, the retainer material 82. The fibers 62 and lines 66 are, thus, prevented from becoming entwined with the fibers and lines of any other devices 60.

In FIG. 8, the retainer 80 is in a spherical form. In addition, the device 60 is compacted, and its compacted shape is retained by the retainer material 82. A shape of the retainer 80 can be chosen as appropriate for a particular device 60 shape, in compacted or un-compacted form.

In FIG. 9, the retainer 80 is in a cubic form. Thus, any type of shape (polyhedron, spherical, cylindrical, etc.) may be used for the retainer 80, in keeping with the principles of this disclosure.

Figure 10:
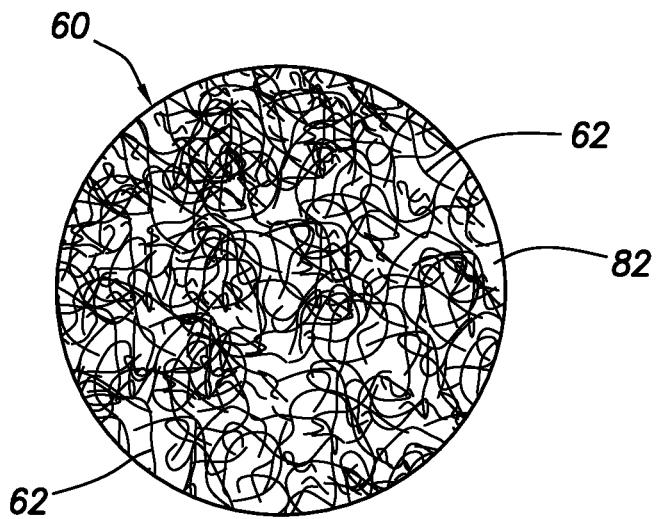
FIGS. 10 & 11 are representative cross-sectional views of additional examples of the flow conveyed plugging device.

Referring additionally now to FIG. 10, a cross-sectional view of another example of the device 60 is representatively illustrated. The device 60 may be used in any of the systems and methods described herein, or may be used in other systems and methods.

In this example, the body of the device 60 is made up of filaments or fibers 62 formed in the shape of a ball or sphere. Of course, other shapes may be used, if desired.

The filaments or fibers 62 may make up all, or substantially all, of the device 60. The fibers 62 may be randomly oriented, or they may be arranged in various orientations as desired.

In the FIG. 10 example, the fibers 62 are retained by the dissolvable, degradable or dispersible material 82. In addition, a frangible coating may be provided on the device 60, for example, in order to delay dissolving of the material 82 until the device has been deployed into a well. Examples of suitable frangible coatings include cementitious materials (e.g., plaster of Paris) and various waxes (e.g., paraffin wax, carnauba wax, vegetable wax, machinable wax). The frangible nature of a wax coating can be optimized for particular conditions by blending a less brittle wax (e.g., paraffin wax) with a more brittle wax (e.g., carnauba wax) in a certain ratio selected for the particular conditions.

The device 60 of FIG. 10 can be used in a diversion fracturing operation (in which perforations receiving the most fluid are plugged to divert fluid flow to other perforations), in a re-completion operation, or in a multiple zone perforate and treat operation.

One advantage of the FIG. 10 device 60 is that it is capable of sealing on irregularly shaped openings, perforations, leak paths or other passageways. The device 60 can also tend to "stick" or adhere to an opening, for example, due to engagement between the fibers 62 and structure surrounding (and in) the opening. In addition, there is an ability to selectively seal openings.

The fibers 62 could, in some examples, comprise wool fibers. The device 60 may be reinforced (e.g., using the material 82 or another material) or may be made entirely of fibrous material with a substantial portion of the fibers 62 randomly oriented.

The fibers 62 could, in some examples, comprise metal wool, or crumpled and/or compressed wire. Wool may be retained with wax or other material (such as the material 82) to form a ball, sphere, cylinder or other shape.

In the FIG. 10 example, the material 82 can comprise a wax (or eutectic metal or other material) that melts at a selected predetermined temperature. A wax device 60 may be reinforced with fibers 62, so that the fibers and the wax (material 82) act together to block a perforation or other passageway.

The selected melting point can be slightly below a static wellbore temperature. The wellbore temperature during fracturing or other stimulation treatment is typically depressed due to relatively low temperature fluids entering wellbore. After treatment, wellbore temperature will typically increase, thereby melting the wax and releasing the reinforcement fibers 62.

A drag coefficient of the device 60 in any of the examples described herein may be modified appropriately to produce a desired result. For example, in a diversion fracturing operation, it is typically desirable to block perforations in a certain location in a wellbore. The location is usually at the perforations taking the most fluid.

Natural fractures in an earth formation penetrated by the wellbore make it so that certain perforations receive a larger portion of treatment fluids. For these situations and others, the device 60 shape, size, density and other characteristics can be selected, so that the device tends to be conveyed by flow to a certain corresponding section of the wellbore.

For example, devices 60 with a larger coefficient of drag (Cd) may tend to seat more toward a toe of a generally horizontal or lateral wellbore. Devices 60 with a smaller Cd may tend to seat more toward a heel of the wellbore.

Figure 11:
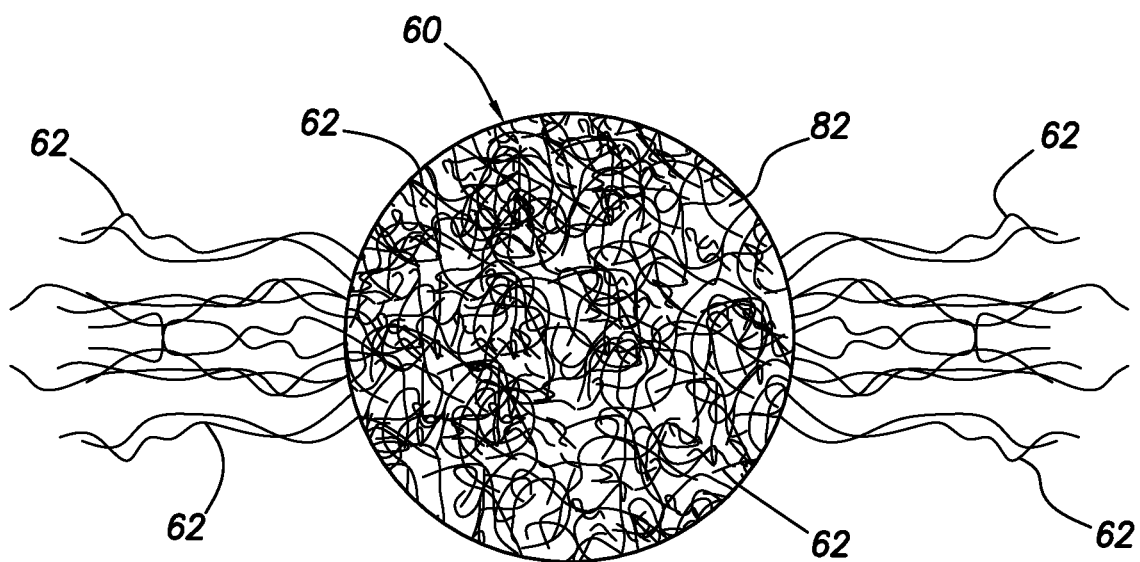

Smaller devices 60 with long fibers 62 floating freely (see the example of FIG. 11) may have a strong tendency to seat at or near the heel. A diameter of the device 60 and the free fiber 62 length can be appropriately selected, so that the device is more suited to stopping and sealingly engaging perforations anywhere along the length of the wellbore.

Acid treating operations can benefit from use of the device 60 examples described herein. Pumping friction causes hydraulic pressure at the heel to be considerably higher than at the toe. This means that the fluid volume pumped into a formation at the heel will be considerably higher than at the toe. Turbulent fluid flow increases this effect. Gelling additives might reduce an onset of turbulence and decrease the magnitude of the pressure drop along the length of the wellbore.

Higher initial pressure at the heel allows zones to be treated and then plugged starting at the heel, and then progressively down along the wellbore. This mitigates waste of acid from attempting to acidize all of the zones at the same time.

The free fibers 62 of the FIGS. 4-6B & 11 examples greatly increase the ability of the device 60 to engage the first open perforation (or other leak path) it encounters. Thus, the devices 60 with low Cd and long fibers 62 can be used to plug from upper perforations to lower perforations, while turbulent acid with high frictional pressure drop is used so that the acid treats the unplugged perforations nearest the top of the wellbore with acid first.

In examples of the device 60 where a wax material (such as the material 82) is used, the fibers 62 (including the body 64, lines 66, knots, etc.) may be treated with a treatment fluid that repels wax (e.g., during a molding process). This may be useful for releasing the wax from the fibrous material after fracturing or otherwise compromising the retainer 80 and/or a frangible coating thereon.

Suitable release agents are water-wetting surfactants (e.g., alkyl ether sulfates, high hydrophilic-lipophilic balance (HLB) nonionic surfactants, betaines, alkyarylsulfonates, alkyldiphenyl ether sulfonates, alkyl sulfates). The release fluid may also comprise a binder to maintain the knot or body 64 in a shape suitable for molding. One example of a binder is a polyvinyl acetate emulsion.

Broken-up or fractured devices 60 can have lower Cd. Broken-up or fractured devices 60 can have smaller cross-sections and can pass through restrictions in the well more readily.

A restriction may be connected in any line or pipe that the devices 60 are pumped through, in order to cause the devices to fracture as they pass through the restriction. This may be used to break up and separate devices 60 into wax and non-wax parts. The restriction may also be used for rupturing a frangible coating covering a soluble wax material 82 to allow water or other well fluids to dissolve the wax.

Fibers 62 may extend outwardly from the device 60, whether or not the body 64 or other main structure of the device also comprises fibers. For example, a ball (or other shape) made of any material could have fibers 62 attached to and extending outwardly therefrom. Such a device 60 will be better able to find and cling to openings, holes, perforations or other leak paths near the heel of the wellbore, as compared to the ball (or other shape) without the fibers 62.

For any of the device 60 examples described herein, the fibers 62 may not dissolve, disperse or otherwise degrade in the well. In such situations, the devices 60 (or at least the fibers 62) may be removed from the well by swabbing, scraping, circulating, milling or other mechanical methods.

In situations where it is desired for the fibers 62 to dissolve, disperse or otherwise degrade in the well, nylon is a suitable acid soluble material for the fibers. Nylon 6 and nylon 66 are acid soluble and suitable for use in the device 60. At relatively low well temperatures, nylon 6 may be preferred over nylon 66, because nylon 6 dissolves faster or more readily.

Self-degrading fiber devices 60 can be prepared from poly-lactic acid (PLA), poly-glycolic acid (PGA), or a combination of PLA and PGA fibers 62. Such fibers 62 may be used in any of the device 60 examples described herein.

Fibers 62 can be continuous monofilament or multifilament, or chopped fiber. Chopped fibers 62 can be carded and twisted into yarn that can be used to prepare fibrous flow conveyed devices 60.

PLA and/or PGA fibers 62 may be coated with a protective material, such as calcium stearate, to slow its reaction with water and thereby delay degradation of the device 60. Different combinations of PLA and PGA materials may be used to achieve corresponding different degradation times or other characteristics.

PLA resin can be spun into fiber of 1-15 denier, for example. Smaller diameter fibers 62 will degrade faster. Fiber denier of less than 5 may be most desirable. PLA resin is commercially available with a range of melting points (e.g., 140 to 365° F.). Fibers 62 spun from lower melting point PLA resin can degrade faster.

PLA bi-component fiber has a core of high-melting point PLA resin and a sheath of low-melting point PLA resin (e.g., 140° F. melting point sheath on a 265° F. melting point core). The low-melting point resin can hydrolyze more rapidly and generate acid that will accelerate degradation of the high-melting point core. This may enable the preparation of a plugging device 60 that will have higher strength in a wellbore environment, yet still degrade in a reasonable time. In various examples, a melting point of the resin can decrease in a radially outward direction in the fiber.

Referring additionally now to FIGS. 12A-14, another example of the dispensing tool 26 is representatively illustrated. This dispensing tool 26 example may be used with the system 10 and method of FIGS. 1-3, or it may be used with other systems and methods.

The dispensing tool 26 of FIGS. 12A-14 may be conveyed by a variety of different conveyances, such as, wireline, coiled tubing, etc. In the following description of the FIGS. 12A-14 dispensing tool 26 example, the dispensing tool is used to place plugging devices 60 in a wellbore. The dispensing tool 26 can also be used to place other materials or chemicals.

In one operational example, the dispensing tool 26 may be run with and below wireline or coiled tubing-conveyed perforating guns or perforators 28 as a part of a perforating assembly 24 in a fracturing operation. After a stage is fractured, the perforators 28 and the dispensing tool 26 are run downhole just above the fractured zone. The plugging devices 60 are dumped prior to firing the perforators 28. When fracturing begins again, the plugging devices 60 shut off the perforations 20a that have just been fractured to force the fracturing fluid into the newly formed perforations 20b.

The dispensing tool 26 example is shown in an initial run-in configuration in FIG. 12A. Plugging devices 60 are located in an enclosure 84 (such as, a flexible sack or bag) in a lower part of the tool 26.

A viscous substance 86 may be placed in the enclosure 84 with the plugging devices 60 to help keep the plugging devices 60 from settling or entangling during storage, shipment, and displacement in the wellbore 12. A lower end of the enclosure 84 is secured to the container 36, for example, using a fastener 78.

There is a radially enlarged boss 88 located below ports 90 of a sliding sleeve valve 92. The boss 88 is used to restrict flow through an annulus formed radially between the casing 16 and the tool 26, to allow the tool to be pumped down with the wireline, coiled tubing or other conveyance 34. The boss 88 restricts flow through the casing 16, and also helps direct fluid flow 74 into the sliding sleeve valve ports 90 and through the tool 26 when the tool is operated to dispense the plugging devices 60.

The dispensing tool 26 can be operated with the actuator 38 described above, or with a conventional packer setting tool, such as a Baker number 10 setting tool. A packer setting tool (not shown) typically operates by retracting a mandrel several inches while restricting displacement of an outer housing.

A mandrel of the setting tool can be threaded to a mandrel 94 of the tool 26. A setting tool adapter 96 can be threaded to the body or outer housing of the setting tool. When the setting tool is actuated, the dispensing tool mandrel 94 is pulled upward (to the left as depicted in FIG. 12A) relative to the setting tool adapter 96.

The setting tool mandrel is typically free to float upward prior to actuation of the setting tool. To prevent accidental operation of the dispensing tool 26, shear pins 100 lock the mandrel 94 in an extended position relative to the setting tool. When the setting tool is actuated, the shear pins 100 shear to allow the dispensing tool mandrel 94 to displace upward.

The upward movement of the mandrel 94 causes a closure member or inner sleeve 98 of the sliding sleeve valve 92 to shift upward. This upward displacement of the sleeve 98 shears pins 100 and opens a lower end of the enclosure 84.

In FIG. 12B, the dispensing tool 26 is representatively illustrated in an open configuration. Ports 90 are opened when the sleeve 98 shifts upward. The open ports 90 provide for fluid communication between an exterior of the dispensing tool 26 (e.g., the annulus between the tool 26 and the casing 16) and an interior flow passage 102 extending through a lower end of the sleeve 98 and into the enclosure 84.

An upper end of the enclosure 84 is attached to the sleeve 98. Thus, when the sleeve 98 displaces upward, the upper end of the enclosure 84 also displaces upward, thereby tearing open the lower end of the enclosure. The lower end of the enclosure 84 is, thus, pierced, cut or opened, allowing the plugging devices 60 to displace out of the enclosure 84. A cutter 104 may be mounted in the container 36 for facilitating opening of the enclosure 84 lower end.

As used herein, the term "pierce" is used in the sense of forming an opening through a material, such as, by cutting, tearing, penetrating or perforating.

Only a portion of the flow 74 passes though the flow passage 102 after the valve 92 has been opened. Part of the flow 74 passes around the boss 88. This split flow 74 helps separate the plugging devices 60, which is beneficial to conveying the plugging devices 60 to the perforations 20a,b or other openings 68 to be plugged.

FIG. 13 shows details of an example of the plugging device enclosure 84. The enclosure 84 includes a flexible material 106 that can be conveniently opened downhole, and is compatible with well environments. TYVEK™, available from E.I. DuPont de Nemours of Wilmington, Del. USA, is suitable for use as the material 106, but any wellbore compatible material may be used instead, or in addition.

As mentioned above, a screw or other fastener 78 (see FIGS. 12A & B) can be used to fasten the lower end of the enclosure 84 to the container 36, the boss 88 or another component of the tool 26. The lower end of the enclosure 84 can be folded and retained closed with a grommet 108. The fastener 78 can extend through the grommet 108 to secure the lower end of the enclosure 84.

The lower end of the enclosure 84 may have perforations or other weakening means to cause it to be torn or pierced in an appropriate place. The perforations may not be necessary, since the folded end can be inherently weaker and will tear off at an upper end of the folds.

The upper end of the enclosure 84 is attached to the valve inner sleeve 98. When the inner sleeve 98 moves up, tension in the enclosure 84 causes the lower end of the enclosure to tear off, thereby opening the lower end.

In the FIG. 13 example, there is an o-ring or other ring-shaped element 110 located at the upper end of the enclosure 84. The material 106 is wrapped about the element 110 and secured with stitches 112. This creates an enlarged thickness at the upper end of the enclosure 84. This enlarged thickness and the ring-shaped element 110 therein can be captured and attached to the lower end of the sliding sleeve valve inner sleeve 98, as described more fully below.

In this example, an elastomeric o-ring is used for the ring-shaped element 110. Depending on their composition, o-rings are usually relatively inexpensive, stiff (resistant to deflection), and resilient (having elasticity). In other examples, the enclosure material 106 could be folded and sewn to accomplish a similar enlarged thickness at the upper end of the enclosure 84 (without use of the separate element 110).

Figure 14:
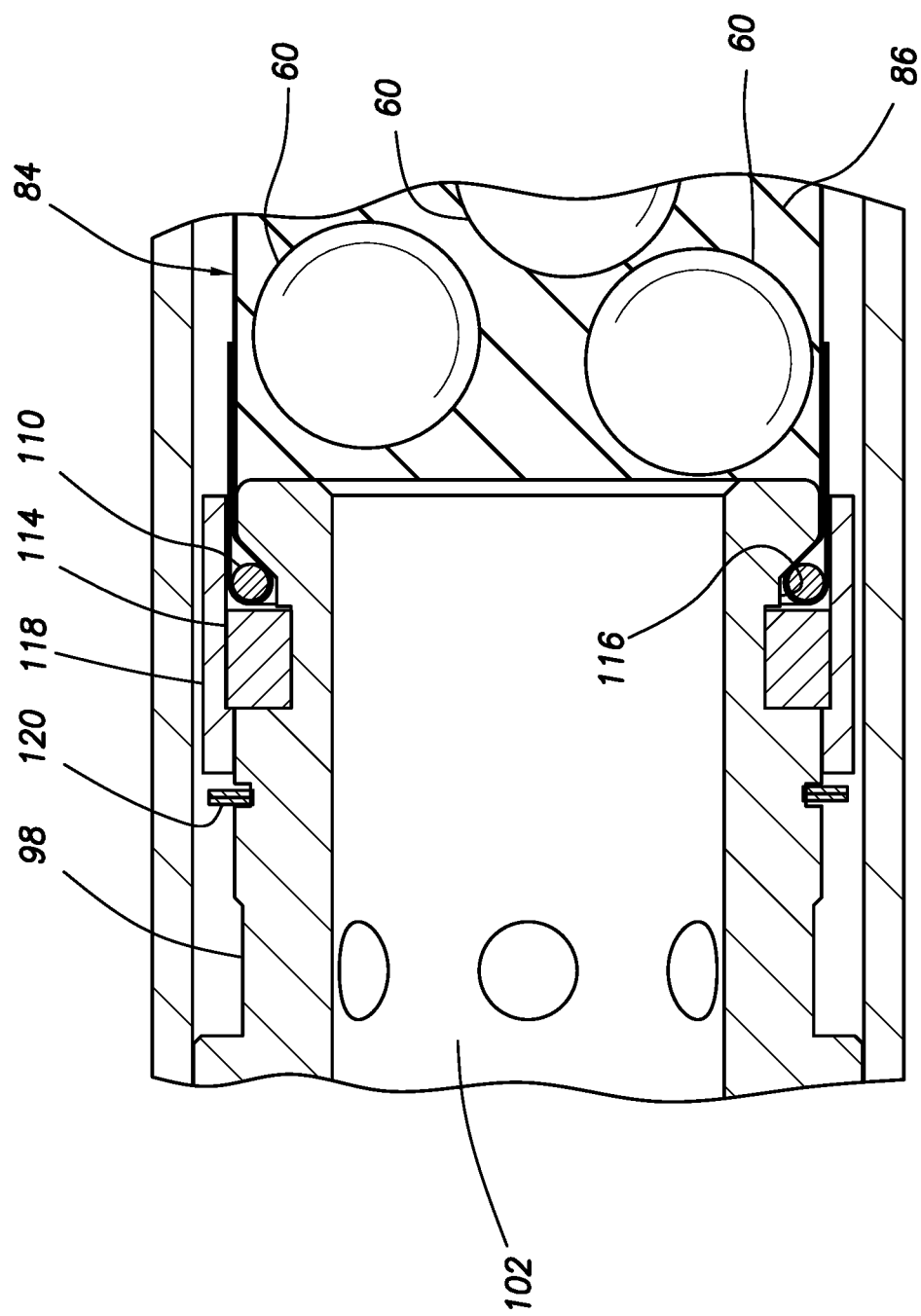
FIG. 14 is a representative cross-sectional view of an attachment between the enclosure and a valve closure member of the dispensing tool.

FIG. 14 depicts an example of the attachment of the upper end of the enclosure 84 to the lower end of the inner sleeve 98. The enlarged thickness upper end of the enclosure 84 is positioned in a recess 116 formed on the lower end of the inner sleeve 98.

A split ring 114 secures the upper end of the enclosure 84 against longitudinal displacement relative to the sleeve 98 and recess 116. A retainer ring 118 prevents displacement of the upper end of the enclosure 84 radially out of the recess 116. A spiral lock ring 120 secures the retainer ring 118 (and, thereby, the split ring 114 and the upper end of the enclosure 84) on the inner sleeve 98.

An example operation of the dispensing tool 26 of FIGS. 12A-14 may be as follows when used with the system 10 of FIGS. 1-3:

Stop pumping fracturing fluids after a first zone 20a is fractured;
Run tool 26 downhole below perforators 28 in the perforating assembly 24;
Locate tool 26 above previously fractured zone 20a;
Actuate packer setting tool or actuator 38;
Pump fluid to displace plugging devices 60 out of dispensing tool 26 with fluid flow 22;
Pull up to next zone 20b position;
Fire perforators 28;
Retrieve perforating assembly 24 from wellbore.

It may be desirable to prevent plugging devices 60 from entangling in the enclosure 84 prior to operation of the dispensing tool 26. To prevent the plugging devices 60 from forming a dense pack and/or tangling with each other, they can be suspended in the substance 86 (such as, a gel) within the enclosure 84. Suitable gelling agents include crosslinked polyacrylate powder (e.g., Carbopol 941), xanthan gum, polyvinyl alcohol, and mixtures of locust bean gum and guar gum.

The plugging devices 60 may comprise a covering of a dry gelling agent that hydrates due to contact with well fluid after the dispensing tool 26 is introduced into the well.

In any of the examples described herein, appropriate materials can be selected to construct plugging devices 60 with controllable lifetimes in various downhole environments. Plugging device diversion can be used in a variety of well stimulation and remedial treatments to control the placement of fluid along a length of a perforated zone.

For a typical new well completion with "plug and perf" techniques, plugging devices 60 that do not self-degrade can be used, because the plugging devices 60 can be removed during a plug-milling operation after the fracturing operation. However, if dissolvable or otherwise degradable plugs are used, self-degrading plugging devices 60 can be desired, so that no subsequent coiled-tubing run or other intervention is necessary to remove the plugging devices.

Self-degrading plugging devices 60 are also beneficial for re-fracturing of older wells, where a coiled-tubing run may not be made after the treatment. For damage removal in older wells, acid-resistant plugging devices 60 may be needed, due to long contact times with hydrochloric acid. High-temperature wells may utilize plugging devices 60 made from fiber that will withstand elevated temperature longer that common fibers, such as nylon 6 or polyester.

All of the materials for making plugging devices 60 described in this disclosure can be in the form of staple fiber or filament that is formed into yarn. The yarn can be then twisted or braided into cord or rope, or twisted into a larger yarn that can be used directly to make plugging devices 60.

Use of staple fiber (e.g., chopped fiber) typically involves additional preliminary steps of carding and one or more drawing steps before spinning into yarn. Open end spinning, ring spinning, and air jet spinning can be used to form the basic yarn from staple fiber. Open end spinning may be preferable, because it typically uses fewer drawing steps than the other spinning techniques, and a heavier yarn (e.g., thread count <4) can be made.

Multiple yarns can be twisted together to prepare plied yarn (e.g., 10 ply or 12 ply) that can be used to make plugging devices 60. As an alternative to plied yarns, DREF spinning (friction spinning), can be used to make a large-diameter yarn without a subsequent plying step. DREF spinning typically uses a monofilament as a base for the staple fiber to form around.

Staple fiber of thermoplastic polymers (e.g., nylon, polyester, polylactic acid, etc.) can be prepared by melt spinning. Polymers not amenable to melt spinning (e.g., rayon, polyaramid, acrylic, polybenzimidazole) may be dissolved in solvent and spun in either a wet or dry process for solvent removal. After spinning, drawing, crimping, and chopping steps produce a staple fiber that can be used in the yarn-spinning process.

Multiple different polymers can be spun into a single, multi-component fiber. Various core-sheath cross sections are possible (e.g., single core, concentric or eccentric cross section; multiple core, "islands in the sea" cross section; segmented pie cross section). Multi-component fiber in this application can be used to prepare a fiber that has sufficient strength, while degrading in a reasonable time in downhole environments. A single component fiber that rapidly degrades may not have sufficient mechanical properties on the time scale of the well treatment. Conversely, a mono-component fiber with adequate mechanical properties may degrade too slowly to be useful.

Polylactic acid (PLA) degradability is related to the degree of crystallinity and melting point of the polymer. For example, poly(L-lactic acid) is more crystalline and degrades slower than poly(D-lactic acid-co-L-lactic acid). In one example, these two types of PLA can be used together in a bi-component fiber to adjust the degradation rate over a wide temperature range.

In addition to the lower crystallinity PLA degrading faster, acid produced by the hydrolysis will accelerate the degradation of the higher-crystallinity PLA. The lower crystallinity PLA can be used as the sheath (as in fiber made for nonwoven cloth applications), or as the core.

To further expand the usable temperature range available with PLA, other combinations of polymers can be used. Potentially useful polymers include poly(glycolic acid), poly(lactic acid-co-glycolic acid), poly(paradioxanone), poly(ε-caprolactone), poly(L-lactic acid-co-ε-caprolactone), poly(L-lactic acid-co-trimethylene carbonate), poly(ε-caprolactone-co-glycolic acid-co-trimethylene carbonate), polybutylene succinate, poly(3-hydroxybutyrate-co-3-hydroxyvalerate), poly(L-lactic acid-block-ethylene glycol), and polyethylene terephthalate. In all of these examples, the acid produced by the faster-degrading polymer can accelerate the degradation of the more stable polymer.

Polyester hydrolysis is catalyzed by both acids and bases, but base-catalyzed hydrolysis is much faster. For low temperature wells where the desired degradation rate cannot be achieved by the spontaneous hydrolysis of the polyester, the degradation rate can be increased by adding a base or base precursor to the polymer before spinning the fiber, or by coating the fiber. Alkaline earth oxides and hydroxides, (e.g., calcium oxide, magnesium oxide, calcium hydroxide, magnesium hydroxide), zinc oxide, sodium tetraborate, calcium carbonate, hexamethylenetetramine, and urea could be used for this purpose.

Combinations of water-soluble polymer and degradable polymer can be used to make bi-component fibers with higher degradation rates than single-component fibers made from a degradable polymer. The degradable polymers listed above can be used in combination with various water-soluble polymers, including polyethylene oxide, polyvinyl acetate, polyvinyl alcohol, methacrylic acid copolymers, copolymers of 2-ethylhexyl acrylate and dimethylaminoethyl methacrylate, and sulfopolyesters.

For sealing perforations in high-temperature wells (e.g., >300° F.), fibers made from common polymers, such as nylon-6 and polyethylene terephthalate, may degrade too rapidly. In high-temperature wells, plugging devices 60 made with fibers comprising hydrolysis-resistant materials could be used.

Potentially suitable materials for use in high-temperature wells include carbon fiber, glass fiber, mineral fiber, ceramic fiber, meta-aramid fiber (e.g., Nomex), para-aramid fiber (e.g., Kevlar), polyacrylonitrile fiber (e.g., Orlon, acrylic, modacrylic), polyparaphenylene sulfide fiber (e.g., Ryton), polybenzanilide, polybenzimidazole fiber (e.g., PBI), polyethylene terephthalate, and fibers made from copolymers and blends. Natural fibers suitable for high temperature include cotton, flax, hemp, sisal, jute, kenaf and coir.

It may now be fully appreciated that the above disclosure provides significant advancements to the art of controlling flow in subterranean wells. In some examples described above, the plugging devices 60 may be dispensed from a dispensing tool 26 (in some cases included in a perforating assembly 24). The dispensing tool 26 can include an enclosure 84 that is cut or torn open to release the plugging devices 60.

A well completion method, system and apparatus are described above, in which plugging devices 60 are released from a container 36 in a wellbore 12. The plugging devices 60 may be released to plug existing perforations 20a. The plugging devices 60 may be released prior to forming additional perforations 20b and fracturing through the additional perforations.

A well completion method, system and apparatus are described above, in which plugging devices 60 are released into a wellbore 12 ahead of a perforating assembly 24. The plugging devices 60 and the perforating assembly 24 may be pumped simultaneously through the wellbore 12.

The plugging devices 60 may plug perforations 20a existing before the perforating assembly 24 is introduced into the wellbore 12. The plugging devices 60 may plug perforations 20b made by the perforating assembly 24.

The plugging devices 60 may comprise a fibrous material, a degradable material, and/or a material selected from nylon, poly-lactic acid, poly-glycolic acid, poly-vinyl alcohol, poly-vinyl acetate and poly-methacrylic acid.

The plugging devices 60 may comprise a knot. The plugging devices 60 may comprise a fibrous material retained by a degradable retainer 80.

A plugging device dispensing tool 26 and method are described above and depicted in the drawings. The plugging devices 60 are disposed within an enclosure 84 of the dispensing tool 26. The enclosure 84 is torn open downhole to release the plugging devices 60 into the wellbore 12.

The enclosure 84 may be torn open in response to actuation of a valve 92. Actuation of the valve 92 may open a flow passage 102 for fluid flow 74 through the dispensing tool 26.

The enclosure 84 may be torn open by actuation of a setting tool or other actuator 38 connected to the dispensing tool 26. The setting tool/actuator 38 may displace an inner mandrel 94 of the dispensing tool 26.

A staple fiber or filament 62 may be formed into yarn. The yarn may be twisted or braided into cord or rope, or twisted into a larger yarn that is used to make the plugging device 60.

Multiple different polymers may be spun into a single, multi-component fiber 62. The different polymers may have different degrees of crystallinity and melting points.

The polymers may comprise poly(L-lactic acid), poly(D-lactic acid-co-L-lactic acid), poly(glycolic acid), poly(lactic acid-co-glycolic acid), poly(paradioxanone), poly(ε-caprolactone), poly(L-lactic acid-co-ε-caprolactone), poly(L-lactic acid-co-trimethylene carbonate), poly(ε-caprolactone-co-glycolic acid-co-trimethylene carbonate), polybutylene succinate, poly(3-hydroxybutyrate-co-3-hydroxyvalerate), poly(L-lactic acid-block-ethylene glycol), and/or polyethylene terephthalate. In all of these examples, an acid produced by the faster-degrading polymer can accelerate the degradation of the more stable polymer.

A degradation rate of a polymer may be increased by adding a base or base precursor to the polymer before spinning the fiber, or by coating the fiber. Alkaline earth oxides and hydroxides, (e.g., calcium oxide, magnesium oxide, calcium hydroxide, magnesium hydroxide), zinc oxide, sodium tetraborate, calcium carbonate, hexamethylenetetramine, and urea are optionally used for this purpose.

The plugging device 60 and method can include combinations of water-soluble polymer and degradable polymer used to make bi-component fibers 62 with higher degradation rates than single-component fibers made from a degradable polymer. The degradable polymers listed above can be used in combination with various water-soluble polymers, including polyethylene oxide, polyvinyl acetate, polyvinyl alcohol, methacrylic acid copolymers, copolymers of 2-ethylhexyl acrylate and dimethylaminoethyl methacrylate, and sulfopolyesters.

The plugging device 60 and method can include use of hydrolysis-resistant materials. Potentially suitable materials for use in high-temperature wells include carbon fiber, glass fiber, mineral fiber, ceramic fiber, meta-aramid fiber (e.g., Nomex™), para-aramid fiber (e.g., Kevlar™), polyacrylonitrile fiber (e.g., Orlon™, acrylic, modacrylic), polyparaphenylene sulfide fiber (e.g., Ryton™), polybenzanilide, polybenzimidazole fiber (e.g., PBI), polyethylene terephthalate, and fibers made from copolymers and blends. Natural fibers suitable for high temperature include cotton, flax, hemp, sisal, jute, kenaf and coir.

A method of deploying plugging devices 60 in a wellbore 12 is provided to the art by the above disclosure. In one example, the method can comprise: conveying a dispensing tool 26 through the wellbore 12, the dispensing tool 26 including an enclosure 84 containing the plugging devices 60; and then opening the enclosure 84 by piercing a material 106 of the enclosure 84, thereby releasing the plugging devices 60 from the enclosure 84 into the wellbore 12 at a downhole location.

The piercing step may include tearing, opening and/or cutting the material 106 of the enclosure 84.

The opening step may include displacing one end of the enclosure 84 relative to an opposite end of the enclosure 84.

The displacing step may include displacing a member of a valve 92. The valve 92 member may comprise an inner sleeve 98 that selectively blocks flow through at least one port 90 of the valve 92.

The releasing step may include producing fluid flow 74 through a flow passage 102 in communication with an interior of the enclosure 84. The opening step may include opening a valve 92, thereby permitting the fluid flow 74 from an exterior of the dispensing tool 26 to the flow passage 102.

The opening step may include operating an actuator 38 of the dispensing tool 26.

The method may include connecting the dispensing tool 26 and a perforator 28 in a perforating assembly 24.

A dispensing tool 26 for dispensing plugging devices 60 into a subterranean well is also provided by the above disclosure. In one example, the dispensing tool 26 can comprise a container 36 having an enclosure 84 therein, the enclosure 84 including a flexible material 106 that contains the plugging devices 60, and an end of the enclosure 84 being secured to a member (such as the inner sleeve 98) displaceable by an actuator 38, and in which the enclosure material 106 is opened in response to displacement of the member by the actuator 38.

An opposite end of the enclosure 84 may be secured against displacement relative to the container 36. A fastener 78 may extend through folds of the flexible material 106 at the opposite end of the enclosure 84.

The member may comprise a closure member of a valve 92. The closure member may comprise an inner sleeve 98, and the valve 92 may comprise a sliding sleeve valve.

The closure member 98 may have a closed position that prevents fluid communication between an exterior of the dispensing tool 26 and an interior flow passage 102 of the dispensing tool 26. The closure member 98 may have an open position in which fluid communication is permitted between the exterior of the dispensing tool 26 and the interior flow passage 102. The flow passage 102 may be in fluid communication with an interior of the enclosure 84.

The above disclosure also provides to the art a plugging device 60 for use in a subterranean well. In one example, the plugging device 60 can include at least one body 64 configured to engage an opening 68 in the well and block fluid flow 74 through the opening 68; and multiple fibers 62, the fibers 62 comprising staple fibers or filaments formed into yarn.

The yarn may be twisted or braided and form cord or rope. The yarn may be twisted or braided to form a larger yarn.

Each of the multiple fibers 62 may comprise multiple different polymers spun into an individual multi-component fiber 62. The different polymers may have respective different degrees of crystallinity and/or respective different melting points.

The polymers may be selected from the group consisting of poly(L-lactic acid), poly(D-lactic acid-co-L-lactic acid), poly(glycolic acid), poly(lactic acid-co-glycolic acid), poly(paradioxanone), poly(ε-caprolactone), poly(L-lactic acid-co-ε-caprolactone), poly(L-lactic acid-co-trimethylene carbonate), poly(ε-caprolactone-co-glycolic acid-co-trimethylene carbonate), polybutylene succinate, poly(3-hydroxybutyrate-co-3-hydroxyvalerate), poly(L-lactic acid-block-ethylene glycol) and polyethylene terephthalate.

An acid produced by a faster-degrading one of the polymers may accelerate degradation of a more stable one of the polymers. A degradation rate of at least one of the polymers may be increased by addition of a base or base precursor to the at least one of the polymers before spinning the fiber 62, or by inclusion of the base or base precursor in a coating on the fiber 62.

The base or base precursor may be selected from the group consisting of alkaline earth oxides, alkaline earth hydroxides, calcium oxide, magnesium oxide, calcium hydroxide, magnesium hydroxide, zinc oxide, sodium tetraborate, calcium carbonate, hexamethylenetetramine and urea.

The polymers may comprise a combination of a water-soluble polymer and a degradable polymer. The water-soluble polymer may be selected from the group consisting of polyethylene oxide, polyvinyl acetate, polyvinyl alcohol, methacrylic acid copolymers, copolymers of 2-ethylhexyl acrylate and dimethylaminoethyl methacrylate and sulfopolyesters.

The multiple fibers 62 may comprise a hydrolysis-resistant material. The hydrolysis-resistant material may be selected from the group consisting of carbon fiber, glass fiber, mineral fiber, ceramic fiber, meta-aramid fiber, para-aramid fiber, polyacrylonitrile fiber, polyparaphenylene sulfide fiber, polybenzanilide, polybenzimidazole fiber, polyethylene terephthalate and fibers made from copolymers and blends. The hydrolysis-resistant material may be selected from the group consisting of cotton, flax, hemp, sisal, jute, kenaf and coir.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of deploying plugging devices in a wellbore, the method comprising:
   conveying a dispensing tool through the wellbore, the dispensing tool including an enclosure containing the plugging devices; and
   then
   pulling one end of the enclosure relative to an opposite end of the enclosure, thereby tearing open the enclosure and releasing the plugging devices from the enclosure into the wellbore at a downhole location.

2. The method of claim 1, in which the pulling comprises displacing a member of a valve.

3. The method of claim 2, in which the valve member comprises an inner sleeve that selectively blocks flow through at least one port of the valve.

4. The method of claim 1, in which the releasing comprises producing fluid flow through a flow passage in communication with an interior of the enclosure.

5. The method of claim 4, in which the pulling comprises opening a valve, thereby permitting the fluid flow from an exterior of the dispensing tool to the flow passage.

6. The method of claim 1, in which the pulling comprises operating an actuator of the dispensing tool.

7. The method of claim 1, further comprising connecting the dispensing tool and a perforator in a perforating assembly.

* * * * *